(12) United States Patent
Moon et al.

(10) Patent No.: US 10,251,184 B2
(45) Date of Patent: Apr. 2, 2019

(54) METHOD AND APPARATUS FOR COMMUNICATION IN WIRELESS COMMUNICATION SYSTEM USING UNLICENSED BAND

(71) Applicant: Samsung Electronics Co., Ltd., Suwon-si, Gyeonggi-do (KR)

(72) Inventors: Jung-Min Moon, Suwon-si (KR); Seung-Hoon Park, Seoul (KR); Sun-Heui Ryoo, Yongin-si (KR); Jung-Soo Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 59 days.

(21) Appl. No.: 15/328,378

(22) PCT Filed: Jan. 29, 2016

(86) PCT No.: PCT/KR2016/001047
§ 371 (c)(1),
(2) Date: Jan. 23, 2017

(87) PCT Pub. No.: WO2016/122274
PCT Pub. Date: Aug. 4, 2016

(65) Prior Publication Data
US 2017/0230986 A1    Aug. 10, 2017

Related U.S. Application Data

(60) Provisional application No. 62/109,213, filed on Jan. 29, 2015.

(51) Int. Cl.
*H04W 72/08*    (2009.01)
*H04L 5/14*    (2006.01)
(Continued)

(52) U.S. Cl.
CPC ............ *H04W 72/085* (2013.01); *H04L 5/14* (2013.01); *H04L 43/16* (2013.01);
(Continued)

(58) Field of Classification Search
None
See application file for complete search history.

(56) References Cited

U.S. PATENT DOCUMENTS 6,434,112 B1    8/2002    Kwon
9,565,593 B2 *  2/2017    Bhushan ........... H04W 28/0289
(Continued)

FOREIGN PATENT DOCUMENTS

WO    2013/087835 A1    6/2013
WO    2014/017735 A1    1/2014

*Primary Examiner* — Hong S Cho
(74) *Attorney, Agent, or Firm* — Jefferson IP Law, LLP

(57) ABSTRACT

A $5^{th}$ generation (5G) or pre-5G communication system for supporting a higher data transfer rate than a $4^{th}$ generation (4G) communication system such as long term evolution (LTE) is provided. A method and apparatus which perform communication in a wireless communication system using an unlicensed band, and a method in which a base station controls a clear channel assessment (CCA) timing in a wireless communication system using an unlicensed band are provided. The method includes determining whether to change CCA timing by comparing a number of at least one of continuous successes or continuous failures in a CCA with a predetermined threshold value and when it is determined that the CCA timing is to be changed, randomizing the CCA timing.

10 Claims, 40 Drawing Sheets

(51) Int. Cl.
  *H04L 12/26* (2006.01)
  *H04W 74/08* (2009.01)
  *H04W 88/08* (2009.01)
  *H04W 72/04* (2009.01)

(52) U.S. Cl.
  CPC ....... *H04W 72/0446* (2013.01); *H04W 74/08* (2013.01); *H04W 88/08* (2013.01)

(56) References Cited

U.S. PATENT DOCUMENTS

| | | | |
|---|---|---|---|
| 9,723,516 B2* | 8/2017 | Bhushan | H04W 28/0289 |
| 2009/0129353 A1* | 5/2009 | Ki | H04W 74/0816 |
| | | | 370/338 |
| 2009/0207747 A1* | 8/2009 | Kim | H04L 43/0811 |
| | | | 370/252 |
| 2009/0238163 A1* | 9/2009 | Zhang | H04W 24/02 |
| | | | 370/338 |
| 2011/0109471 A1* | 5/2011 | Park | H04W 52/0232 |
| | | | 340/870.01 |
| 2013/0142180 A1 | 6/2013 | Gidlund et al. | |
| 2014/0335876 A1 | 11/2014 | Ratasuk et al. | |
| 2015/0023315 A1* | 1/2015 | Yerramalli | H04W 74/002 |
| | | | 370/330 |
| 2015/0215966 A1 | 7/2015 | Kim et al. | |

* cited by examiner

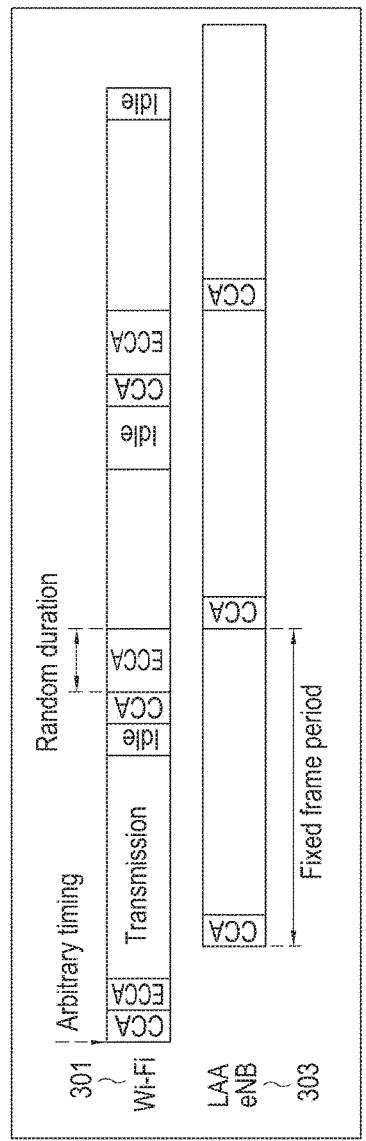
FIG.3A
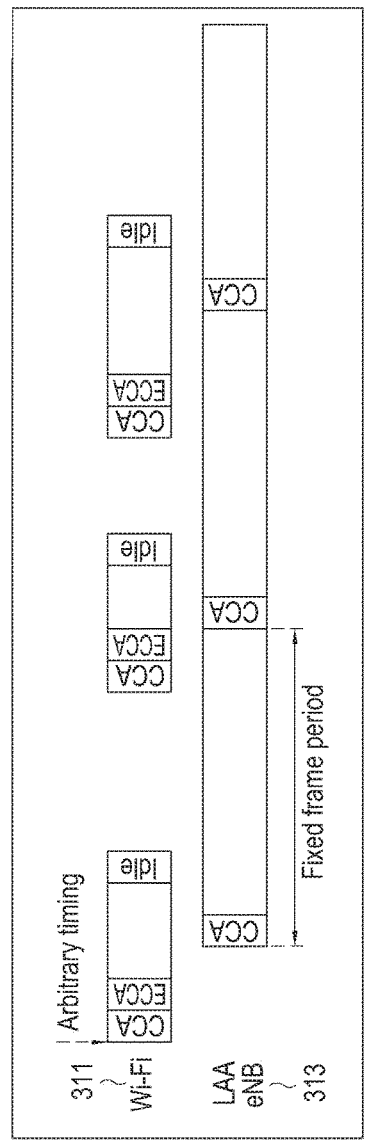
FIG.3B
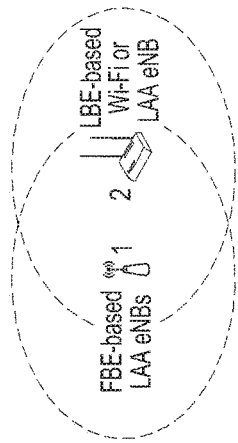

METHOD AND APPARATUS FOR COMMUNICATION IN WIRELESS COMMUNICATION SYSTEM USING UNLICENSED BAND

CROSS-REFERENCE TO RELATED APPLICATION(S)

This application is a U.S. National Stage application under 35 U.S.C. § 371 of an International application filed on Jan. 29, 2016 and assigned application number PCT/KR2016/001047, which claimed the benefit of a U.S. Provisional application filed on Jan. 29, 2015 in the U.S. Patent and Trademark Office and assigned Ser. No. 62/109,213, the entire disclosure of each of which is hereby incorporated by reference.

TECHNICAL FIELD

The present disclosure relates to a method and device for performing communication by a communication device in a wireless communication system using an unlicensed band.

BACKGROUND

In order to meet wireless data traffic demands that have increased after $4^{th}$ generation (4G) communication system commercialization, efforts to develop an improved $5^{th}$ generation (5G) communication system or a pre-5G communication system have been made. For this reason, the 5G communication system or the pre-5G communication system is called a beyond 4G network communication system or a post long term evolution (LTE) system.

In order to achieve a high data transmission rate, an implementation of the 5G communication system in an mmWave band (for example, 60 GHz band) is being considered. In the 5G communication system, technologies, such as beamforming, massive MIMO, full dimensional MIMO (FD-MIMO), an array antenna, analog beam-forming, and a large scale antenna, are discussed to mitigate a propagation path loss in the mmWave band and to increase a propagation transmission distance.

Further, technologies, such as an evolved small cell, an advanced small cell, a cloud radio access network (cloud RAN), an ultra-dense network, device to device communication (D2D), a wireless backhaul, a moving network, cooperative communication, coordinated multi-points (CoMP), and interference cancellation, have been developed to improve the system network in the 5G communication system.

In addition, the 5G system has developed advanced coding modulation (ACM) schemes, such as hybrid frequency-shift keying (FSK) and quadrature amplitude modulation (QAM) modulation (FQAM) and sliding window superposition coding (SWSC) and advanced access technologies, such as filter bank multi carrier (FBMC), non orthogonal multiple access (NOMA), and sparse code multiple access (SCMA).

Communication using a shared band has to comply with transmission regulations determined for a band to be used. These transmission regulations use various types of methods in order to mitigate signal interference between devices. Examples of the methods include a method of restricting transmission power to prevent reception power at a predetermined distance from exceeding a particular value, a method of hopping the location of a resource in a time or frequency domain, a method of using only some of all resources, and a method of receiving a signal from a different device first and making transmission possible when the reception power of the signal is lower than a particular value. A representative frequency band is an unlicensed band called a "License-exempt" or "Unlicensed" band. While a 5 GHz unlicensed band will hereinafter be described as an example in the present specification for the convenience of description, the following description may also be applied to other frequency bands based on similar shared regulations.

A communication device that uses an unlicensed band in a communication system may be divided into, for example, frame-based equipment (FBE) and load-based equipment (LBE). Each communication device satisfies the following regulations.

First, an FBE performs clear channel assessment (CCA) for 20 ms or more before a communication device performs transmission. The CCA may be understood as an operation of measuring the magnitude of interference before the communication device performs the transmission and determining whether another communication device uses the current unlicensed band. The FBE does not perform the transmission when the measurement result shows that the magnitude of the interference is greater than or equal to a predetermined value, and performs the transmission when the magnitude of the interference is less than the predetermined value.

FIG. 1A illustrates an example of a CCA operation of an FBE in an unlicensed band according to the related art.

Referring to FIG. 1A, if the FBE performs CCA 101 once, the FBE may occupy the unlicensed band for a time duration 103 of 1 ms to 10 ms and then has to rest without performing transmission for a time duration of at least 5% of the occupancy time 103. This is called an idle period 105. If the CCA execution result of the FBE shows that another communication device currently uses the unlicensed band, the FBE may perform CCA 109 again after a fixed frame period 107 passes.

Second, similar to the FBE, the LBE performs CCA for 20 ms or more before the LBE performs transmission. Namely, since the CCA in the FBE and LBE schemes corresponds to an operation of determining whether another communication device currently uses the unlicensed band prior to transmission, the CCA is performed at a transmission side.

FIG. 1B illustrates an example of a CCA operation of an LBE in an unlicensed band according to the related art.

Referring to FIG. 1B, the LBE performs transmission when the result obtained by performing CCA 111 shows that there is no communication device that currently uses the unlicensed band. However, when it is determined that another communication device currently uses the unlicensed band, the LBE may perform additional CCA, as opposed to the FBE. Hereinafter, the additional CCA is referred to as extended CCA (ECCA). The ECCA 113 is constituted by, for example, N CCAs 115, where N is an arbitrarily selected value between 1 and q, and q is a given value. The LBE performs transmission when the result obtained by performing the ECCA 113 shows that there is no communication device that currently uses the unlicensed band. In this case, the time 117 during which the LBE can occupy the unlicensed band is a maximum of $(13/32)*q$ ms, and the LBE thereafter performs ECCA again to have an idle period 119 during that time.

An FBE and an LBE have the following advantages and shortcomings. First, the LBE will exhibit higher performance than the FBE in view of a probability to occupy an unlicensed band. The reason for this is that the FBE cannot perform CCA again for a fixed frame period if the FBE fails in CCA once, whereas the LBE can perform an operation of occupying an unlicensed band by performing ECCA, that is, N additional CCAs after the LBE fails in CCA. Next, the FBE is advantageous in that the FBE is simpler than the LBE in view of scheduling, for example, transmission of a physical downlink control channel (PDCCH) in a LTE system. The FBE can use an unlicensed band based on a sub-frame boundary (i.e., PDCCH transmission time point). However, the LBE cannot harmonize the time point when an unlicensed band starts to be used with a sub-frame boundary since the LBE arbitrarily selects N that is the number of times that CCA of ECCA is performed.

FIG. 42 illustrates an example of an LBE scheme using a reservation signal in an unlicensed band.

Referring to FIG. 42, in the example, the LBE may reserve a part of a first sub-frame (sub-frame #0) 4201 and may perform PDCCH and data transmission from a second sub-frame (sub-frame #1) 4203.

In addition, the FBE causes minor damage to the surrounding Wi-Fi that shares an unlicensed band, compared with the LBE. Generally, the LBE has a higher probability to occupy an unlicensed band than the FBE. This is because Wi-Fi is considered to deprive more opportunities to occupy the unlicensed band.

Accordingly, a method of maintaining access to a licensed band is required to provide a reliable cellular communication service in a moving environment even though a UE uses an unlicensed band. An available data transmission rate can be enhanced by transmitting data of a service sensitive to a delay (such as a voice, etc.) using a licensed band and by transmitting a data service that is insensitive to a delay selectively using an unlicensed band in addition to the licensed band.

A structure considered in order to use an unlicensed band in a cellular system broadly includes a carrier aggregation (CA) structure and a dual connectivity (DC) structure. The CA structure, which allows a primary cell (PCell) to operate in a licensed band and one or more SCells to operate in an unlicensed band, may allow initial access, arbitrary access, channel quality report, and ACK/NACK report for major control procedures to operate in the PCell to ensure performance. In contrast, the DC structure, in which a PUCCH SCell (PS Cell) having a PUCCH is configured separately from a PCell in an unlicensed band, may perform initial access, arbitrary access, channel quality report, and ACK/NACK report for major control procedures in the PSCell. In the present specification, the PCell may be replaced by an SCell for which a report resource is configured through a channel other than a PSCell or PUCCH.

The following procedure is required to determine the transmission capacity of a transmission/reception link in an existing cellular communication system that is the same as an LTE system. In a downlink, a UE measures a reference signal of an evolved node B (eNB) and reports the quality of the signal to the eNB. The reference signal of the eNB may include a common/cell-specific reference signal (CRS) given in common to all UEs in the region of the eNB, a dedicated reference signal (DRS) given only to a particular UE, a channel state information-RS (CSI-RS), and the like. The UE may be controlled by the eNB to periodically or aperiodically report channel quality to the eNB using a channel quality indicator (CQI). The UE uses an uplink control channel for the periodic report and uses an uplink data channel for the aperiodic report. Based on the CQI reported by the UE, the eNB performs a scheduling process to determine a UE to which a physical channel resource block is to be allocated, and informs of allocation information for each UE according to the result. The allocation information is notified as a control signal that is scrambled to cell-radio network temporary identity (C-RNTI) or multimedia broadcast multicast service (MBMS)-RNTI (M-RNTI) of the UE through a PDCCH, and the UE having received the allocation information receives an allocated physical channel resource block from a physical downlink shared channel (PDSCH) notified by the control signal. In an uplink, the eNB may measure a reference signal of the UE to identify the quality of the signal. The reference signal of the UE may use a sounding reference signal (SRS) periodically (2 to 320 ms) allocated to a particular UE by the eNB. Although differing from the current standard, the use of demodulation reference signal (DMRS) transmitted together with uplink data of the UE may also be considered for an operation in a shared band. Based on the CQI obtained by measuring the reference signal transmitted by the UE, the eNB performs a scheduling process to determine a UE to which a physical channel resource block is to be allocated, and informs of allocation information for each UE according to the result. The allocation information is notified as a control signal that is scrambled to C-RNTI or M-RNTI of the UE through a PDCCH, and the UE having received the allocation information transmits an allocated physical channel resource block from a physical uplink shared channel (PUSCH) notified by the control signal.

A predetermined delay time or more is spent due to signal transmission/reception and processing that are required by an eNB to complete channel measurement and link adaptation together with a UE. For example, in regard to an operation in a downlink, as in the example of FIG. 21.

FIG. 21 is a view for explaining a channel state information (CSI) feedback delay in a wireless communication system.

Referring to FIG. 21, two sub-frames are required by the UE to measure a reference signal 2101 transmitted by the eNB in every downlink sub-frame and to report a CQI 2103 to a physical uplink control channel (PUCCH) allocated to every uplink sub-frame. The eNB requires one sub-frame to perform channel estimation 2105 and one to k sub-frames 2107 according to implementations for scheduling to determine resource allocation and a modulation & coding scheme (MCS) index. Accordingly, an available minimum CQI feedback delay of 4 ms is required. Since the minimum period of a periodic CQI report resource is two sub-frames in an uplink, the uplink additionally has a delay corresponding to one sub-frame, compared with a downlink so that 5 ms is required. If the period of the CQI report resource increases, the entire CQI feedback delay also increases by the increment.

As described above, an LTE system may provide a minimal CQI feedback delay when measuring a periodic reference signal. However, the following three problems may happen in applying an existing link adaptation technique in a shared band, such as an unlicensed band, in which a rule for the coexistence between different communication systems is required.

A first problem is inaccuracy of periodic reference signal measurement. Due to the listen before talk (LBT) regulation, an eNB is not guaranteed to transmit a periodic reference signal, and even though there is no regulation, a measurement of the periodic reference signal is likely to vary seriously. Although a UE performs measurement in the position of a periodically allocated reference signal resource, if the UE does not know the fact that the eNB does not succeed in LBT, the measurement is withdrawn or is performed in a signal resource to which a reference signal is not actually transmitted. For example, even though there is an LBT regulation in a particular region, such as Europe, a short control signal (SCS) is exempted from using LBT. The condition for the SCS has to be designed such that a transmission device occupies and transmits, for example, only 5% of a resource within 50 ms. Even though a periodic reference signal can be transmitted in this way, the UE suffers from discontinuous interference from an adjacent Wi-Fi AP/UE or an LTE UE that belongs to an asynchronous cell eNB or an asynchronous cell. The discontinuous interference is caused by CCA or a hidden node. For example, if a device has a configured CCA threshold, a UE having received, from another eNB, an interference signal with power that is higher than the CCA threshold cannot perform transmission. In this case, whether devices adjacent to the eNB can perform transmission is determined according to the eNB's success or failure in LBT. Accordingly, a difference in the amount of interference may be noticeable. The first problem happens identically even when an uplink transmits an SRS of a UE.

A second problem is the use of a discontinuous wireless resource. For example, the problem may occur in a case of measuring an aperiodic reference signal. Namely, due to a problem in measurement of a periodic reference signal, a problem may happen even though an eNB measures a transmitted reference signal in a sub-frame in which data is transmitted after a success in LBT. Since a success or failure in LBT is arbitrary, the channel measured at the time point when LBT has succeeded last is more likely to differ from that measured at the current time point when LBT succeeds. Although the eNB may perform scheduling based on channel quality measured in the previous sub-frame only when a plurality of sub-frames are continuously allocated to one UE, a delay of at least 4 ms may occur as described above. Accordingly, a time point when resource allocation is performed based on a CQI measured in the n-th sub-frame is possible in the (n+4)-th sub-frame. While a resource has to be allocated to one UE beyond at least (n+4)-th sub-frame, it is impossible to ensure this since a large amount of traffic is not always stacked in a waiting queue. So, the eNB may minimize the number of physical resource blocks (PRBs) allocated to one UE in one sub-frame for continuous sub-frame allocation. However, since a dedicated RS (DRS, for a downlink) or demodulation RS (DMRS, for an uplink) included in an allocated data resource is used, it is impossible to identify the quality of a resource other than the PRB allocated by the eNB in the first sub-frame. That is, since there is no comparing channel qualities for various frequency PRBs, frequency selective scheduling is impossible only with an uplink signal.

A third problem is a delay of a CQI report time point. A delay time for CQI report occurs so that it may be difficult to accurately measure a channel. This may occur when data is transmitted to a downlink. When a UE having measured a reference signal transmitted by an eNB attempts to report with an uplink resource allocated by the eNB, a delay corresponding to one CCA period (for example, one sub-frame) may occur in an FBE scheme every time CCA fails. Since an LBE scheme has a problem in that multiple UEs within the service region of an eNB compete together, the LBE scheme is not preferred in an uplink.

The above information is presented as background information only, to assist with an understanding of the present disclosure. No determination has been made, and no assertion is made, as to whether any of the above might be applicable as prior art with regard to the present disclosure.

SUMMARY

Aspects of the present disclosure are provided to address at least the above-mentioned problems and/or disadvantages, and to provide at least the advantages described below. Accordingly, an aspect of the present disclosure is to provide an efficient communication method and device in a wireless communication system using an unlicensed band.

Another aspect of the present disclosure is to provide a method and device for efficiently controlling clear channel assessment (CCA) timing in a wireless communication system using an unlicensed band.

Another aspect of the present disclosure is to provide a method and device for providing fairness in a wireless communication system using an unlicensed band.

Another aspect of the present disclosure is to provide an efficient channel quality report method and an efficient link adaptation method, and a device therefor in a wireless communication system that shares resources in a frame-based equipment (FBE) or load-based equipment (LBE) scheme in a shared band, such as an unlicensed band.

In accordance with an aspect of the present disclosure, a method of controlling CCA timing by a base station in a wireless communication system using an unlicensed band is provided. The method includes determining whether to change CCA timing by comparing a number of at least one of continuous successes or continuous failures in the CCA with a predetermined threshold value and randomizing the CCA timing when the CCA timing is determined to be changed.

In accordance with another aspect of the present disclosure, a base station for controlling CCA timing in a wireless communication system using an unlicensed band is provided. The base station includes a transceiver configured to transmit and receive data and at least one processor configured to determine whether to change CCA timing by comparing a number of at least one of continuous successes or continuous failures in the CCA with a predetermined threshold value and control the randomization of the CCA timing when the CCA timing is determined to be changed.

In accordance with another aspect of the present disclosure, a method of providing fairness by a base station in a wireless communication system using an unlicensed band is provided. The method includes applying a circular shift in units of sub-frames to a basic time-division duplex (TDD) sub-frame configuration when a channel occupancy or non-occupancy state continues in the unlicensed band for a predetermined number of uplink (UL) periods and performing CCA using the circular-shifted TDD sub-frame configuration.

In accordance with another aspect of the present disclosure, a base station for providing fairness in a wireless communication system using an unlicensed band is provided. The base station includes a transceiver configured to transmit and receive data and at least one processor configured to apply a circular shift in units of sub-frames to a basic TDD sub-frame configuration when a channel occupancy or non-occupancy state continues in the unlicensed band for a predetermined number of UL periods and perform CCA using the circular-shifted TDD sub-frame configuration.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 3A and 3B are views for explaining cases in which CCA continually fails in an FBE-based licensed-assisted access (LAA)-long term evolution (LTE) according to various embodiments of the present disclosure;

Throughout the drawings, it should be noted that like reference numbers are used to depict the same or similar elements, features, and structures.

DETAILED DESCRIPTION

Figure 1A:
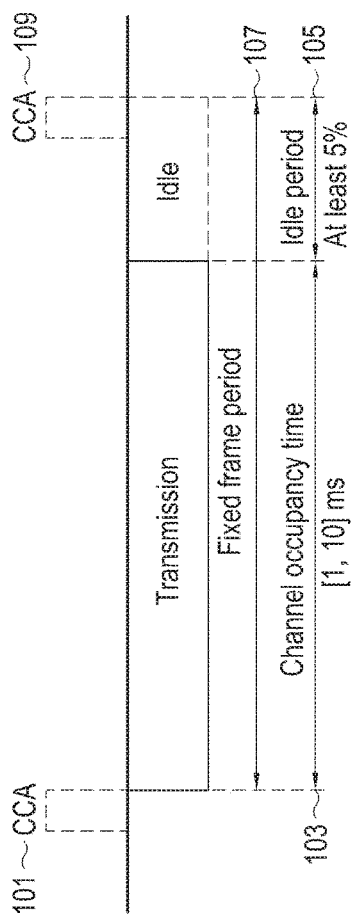
FIG. 1A illustrates an example of a clear channel assessment (CCA) operation of a frame-based equipment (FBE) in an unlicensed band according to the related art.
Figure 1B:
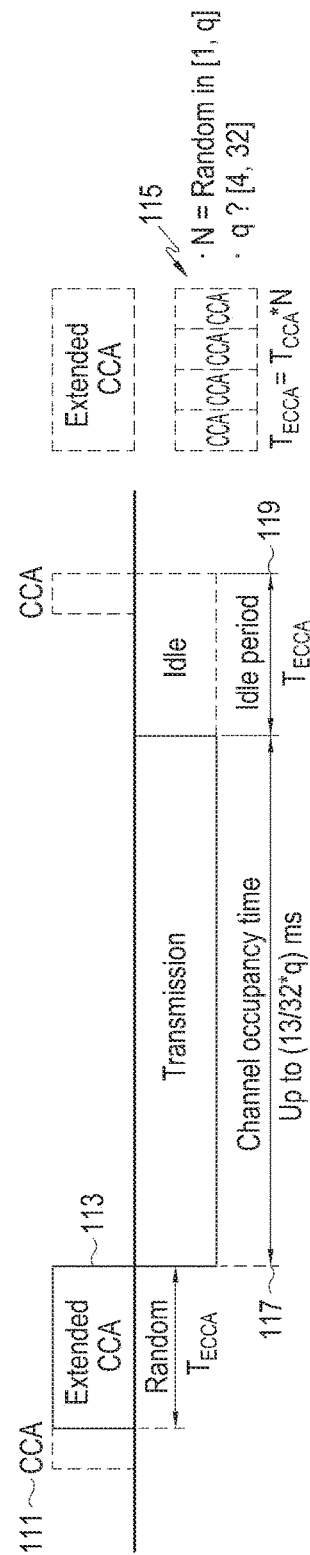
FIG. 1B illustrates an example of a CCA operation of a load-based equipment (LBE) in an unlicensed band according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the detailed description of the present disclosure, an example of interpretable meanings of some terms used in the present disclosure is proposed. However, it is noted that the terms are not limited to the examples of the construable meanings which are proposed below.

In the following description of embodiments of the present disclosure, a detailed description of known functions or configurations incorporated herein will be omitted when it is determined that the detailed description thereof may unnecessarily obscure the subject matter of the present disclosure.

In the detailed description of the present disclosure, an example of interpretable meanings of some terms used in the present disclosure is proposed. However, it is noted that the terms are not limited to the examples of the construable meanings which are proposed below.

A base station, which is a subject communicating with user equipment, may be referred to as a BS, a base transceiver station (BTS), a Node B (NB), an eNodeB, an access point (AP), or the like. A heterogeneous network constituted by a main base station and an auxiliary base station is the dominant background of the present disclosure, in which the main base station may be referred to as a Macro BS, a primary cell (PCell), or the like, and the auxiliary base station may be referred to as a small BS, a secondary cell (SCell), or the like. User equipment (UE), which is a subject communicating with the base station, may be referred to as an UE, a device, a mobile station (MS), mobile equipment (ME), a terminal, or the like.

In the heterogeneous network, the user equipment may communicate with the PCell for transmission and reception of critical system information and control signals and for traffic, such as a voice, which is sensitive to mobility and may communicate with the SCell for traffic, such as data, for which instantaneous transmission rating is important. In embodiments of the present disclosure, it is assumed that the SCell has been configured in a shared band. The LTE licensed-assisted access (LAA) standard may exemplify this type of cellular communication system. In the following embodiments of the present disclosure, user equipment that additionally uses a shared band identical with an unlicensed band, in addition to an existing licensed band, will be referred to as an LAA UE, and user equipment that uses only the existing licensed band will be referred to as an LTE UE. Likewise, a base station that additionally uses the shared band identical with the unlicensed band, in addition to the existing licensed band, will be referred to as an LAA base station, and a base station that uses only the existing licensed band will be referred to as an LTE base station. Furthermore, an LTE system that operates in the unlicensed band will be referred to as a LAA using LTE (LAA-LTE). An LTE system will be described as an example in the following embodiments of the present disclosure, but the present disclosure may also be applied to other communication systems that support communication in the unlicensed band.

Embodiments of the present disclosure propose a technology for enhancing the performance and fairness of an LAA-LTE. First, a situation in which an LAA-LTE operates based on FBE is considered. If multiple base stations installed by a specific service provider use the same unlicensed band, the service provider may harmonize synchronization between the base stations.

Figure 10:
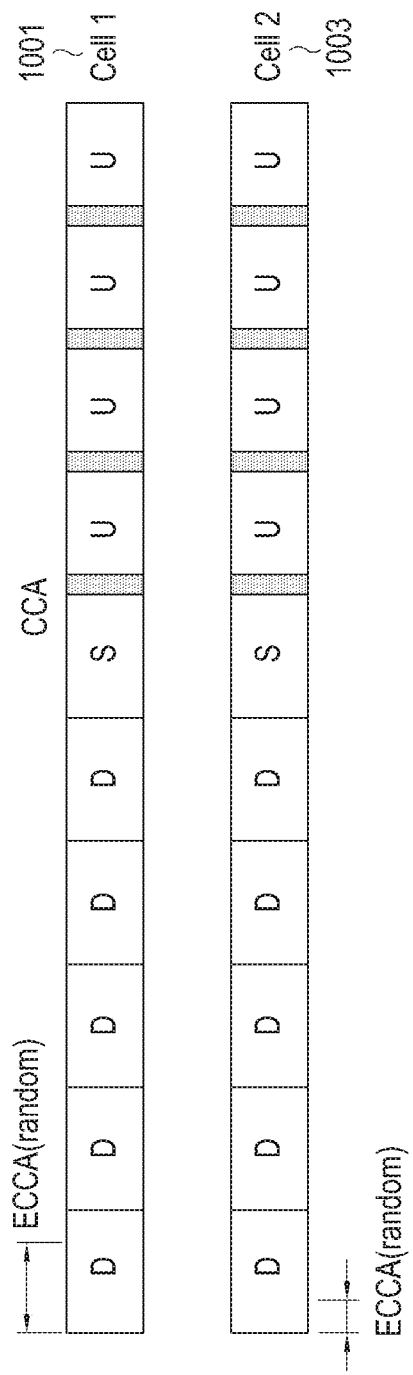
FIG. 10 is a view for explaining a case in which synchronization between multiple Cells is harmonized in a same unlicensed band according to an embodiment of the present disclosure.

FIG. 10 is a view for explaining a case in which synchronization between multiple Cells is harmonized in a same unlicensed band according to an embodiment of the present disclosure.

Referring to FIG. 10, since Cell #1 1001 and Cell #2 1003 attempt CCA at the same time, whether Cell #1 1001 succeeds or fails in the CCA does not affect whether Cell #2 1003 succeeds or fails in the CCA. In a case in which synchronization between the Cells 1001 and 1003 is harmonized in an LAA-LTE, as in the example of FIG. 10, the Cells can independently perform the CCA, and when the multiple Cells succeed in the CCA at the same time, the Cells can achieve frequency reuse 1, thereby enhancing the spectral efficiency of the LAA-LTE.

In contrast, in a case in which multiple Cells installed by different service providers use the same unlicensed band, synchronization between the Cells may not be harmonized.

Figure 2:
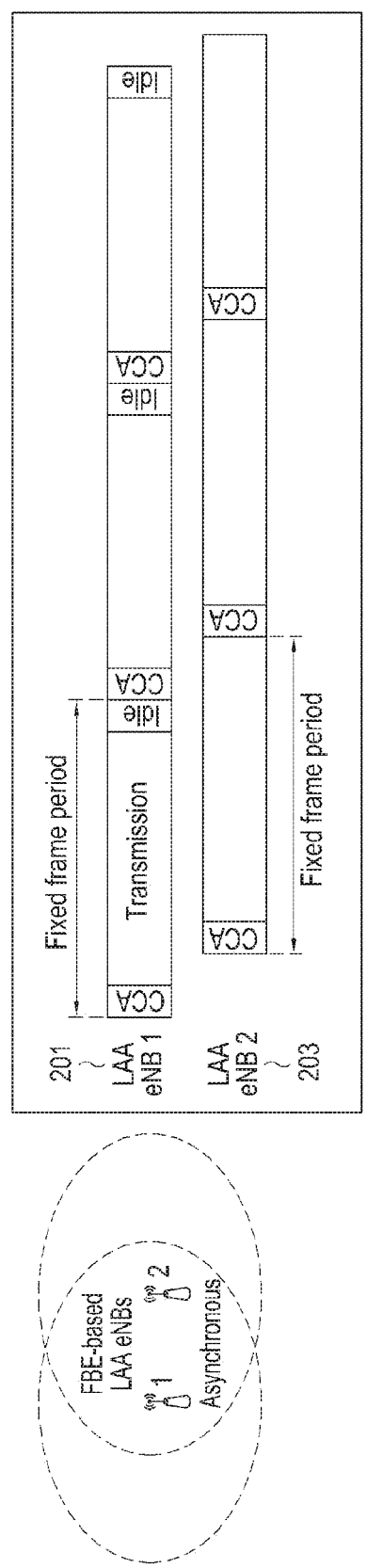
FIG. 2 is a view for explaining a case in which synchronization between multiple evolved node Bs (eNBs) is not harmonized in a same unlicensed band according to an embodiment of the present disclosure.

FIG. 2 is a view for explaining a case in which synchronization between multiple eNBs is not harmonized in a same unlicensed band according to an embodiment of the present disclosure.

Referring to FIG. 2, since CCA is performed every predetermined time (that is, every fixed frame period) in an FBE scheme, LAA eNB #1 201 is likely to continually perform the CCA prior to LAA eNB #2 203. As a result, when LAA eNB #1 201 succeeds in the CCA, LAA eNB #2 203 will fail in the CCA since LAA eNB #2 203 determines that LAA eNB #1 201 has occupied the unlicensed band, and this phenomenon may continue due to the nature of the FBE scheme. Accordingly, a method is required to solve the problem that synchronization between eNBs is not harmonized in an FBE-based LAA-LTE. The method to solve the problem may also be identically applied to a case in which multiple LAA eNBs installed by one service provider operate with different synchronizations.

In an LAA-LTE, CCA is likely to continually fail even when an FBE-based LAA-LTE and an LBE-based Wi-Fi use the same unlicensed band.

FIGS. 3A and 3B are views for explaining cases in which CCA continually fails in an FBE-based LAA-LTE according to various embodiments of the present disclosure.

Referring to FIGS. 3A and 3B, an FBE performs CCA every predetermined time (that is, every fixed frame period) as described above, whereas LBE may perform CCA at an arbitrary time point in accordance with the idle time rule (the LBE is maintained in an idle state while extended CCA is being performed). Accordingly, if LBE-based Wi-Fi eNBs 301 and 311 that rarely have a limitation in a CCA execution time point occupy an unlicensed band every time FBE-based LAA-LTE eNBs 303 and 313 perform CCA, as in the examples of FIGS. 3A and 3B, the FBE-based LAA-LTE eNBs 303 and 313 will continually fail in the CCA. Since this problem may cause a significant degradation in the performance of the FBE-based LAA-LTE, a method is required to solve the problem. Furthermore, although not illustrated, the problem illustrated with reference to FIGS. 3A and 3B may identically happen even when an FBE-based LAA-LTE eNB and an LBE-based LAA-LTE eNB use the same unlicensed band.

Embodiments of the present disclosure propose the following technology in order to solve the problem that an FBE-based LAA-LTE eNB continually fails in CCA when eNBs having different synchronizations operate in the same unlicensed band in an FBE-based LAA-LTE system, or when an LBE-based LAA-LTE eNB or an LBE-based Wi-Fi eNB operates in the same unlicensed band in an FBE-based LAA-LTE system.

First, the proposed technology is based on the fact that an eNB randomizes a CCA execution time point according to a specific condition in an FBE-based LAA-LTE system.

Second, conditions for changing the CCA execution time point may be subdivided according to the following determinations:

(a) Which eNB changes the CCA execution time point?
(b) When is the CCA execution time point determined to be changed?
(c) How is the changed CCA execution time point determined?

Third, the proposed technology subdivided by the above criteria may be listed as in Table 1 below. In embodiments of the present disclosure, an eNB that continually succeeds in CCA more than a predetermined number of times, or succeeds in CCA for a predetermined time or more, is referred to as a first eNB, and an eNB that continually fails in CCA more than a predetermined number of times, or fails in CCA for a predetermined time or more, is referred to as a second eNB. The first eNB may be referred to as various names, such as an occupied eNB, an aggressor eNB, etc. The second eNB may be referred to as various names, such as an unoccupied eNB, a victim eNB, etc.

TABLE 1

| | (a) Target eNB to change CCA time point | (b) Time to change CCA time point | (c) Changed CCA time point |
|---|---|---|---|
| 1 | All eNBs | Every constant time period Every arbitrary time period | CCA timing randomization Sub-frame level Symbol level CCA timing search ON/OFF period randomization |
| 2 | First eNB | When CCA continually succeeds K times When CCA succeeds by X % for time T | |
| 3 | Second eNB | When CCA continually fails K times When CCA fails by X % for time T | |

Scheme 1-(a) (i.e., row 1, col. a of Table 1). Randomize CCA timing at a sub-frame level.
  Target eNB: all eNBs or first or second eNB
  Time to perform randomization: varying according to target eNB
  New CCA time point: CCA timing randomization The scheme 1-(a) is a method in which all the eNBs or the first or second eNB randomizes CCA timing every specific time period. In a case where the scheme 1-(a) is applied to all the eNBs, each eNB randomizes CCA timing every constant time period or every arbitrary time period. Furthermore, in a case where the scheme 1-(a) is applied to the first eNB, which is an occupied eNB, the corresponding eNB randomizes CCA timing when the eNB continually succeeds in CCA K times or when a success rate for CCA for a predetermined period of time T is higher than or equal to a predetermined rate (X %). Likewise, in a case where the scheme 1-(a) is applied to the second eNB, which is an unoccupied eNB, the corresponding eNB randomizes CCA timing when the eNB continually fails in CCA K times or when a failure rate for CCA for a predetermined period of time T is higher than or equal to a predetermined rate (X %).

Figure 4:
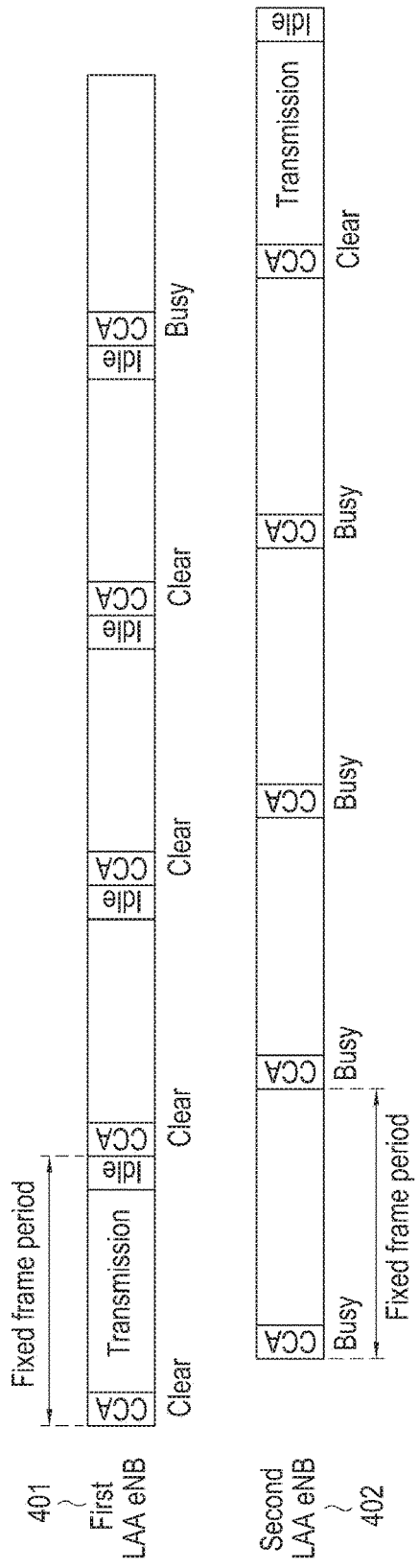
FIG. 4 is a view for explaining first and second eNBs in an unlicensed band according to an embodiment of the present disclosure.

FIG. 4 is a view for explaining first and second eNBs in an unlicensed band according to an embodiment of the present disclosure.

Referring to FIG. 4, an FBE-based LAA-LTE eNB performs CCA every predetermined time, that is, every fixed framed period. Accordingly, in a case where eNBs having different synchronizations operate in the same unlicensed band, one eNB is likely to continually perform CCA prior to another eNB. In this case, as illustrated in FIG. 4, an eNB that performs CCA earlier (i.e., a first LAA eNB 401) may continually occupy the unlicensed band, whereas an eNB that performs CCA later (i.e., a second LAA eNB 402) cannot have a chance to occupy the unlicensed band due to a failure in CCA. In order to prevent the unfairness, multiple CCA timing randomization technologies proposed in embodiments of the present disclosure are required.

Figure 5:
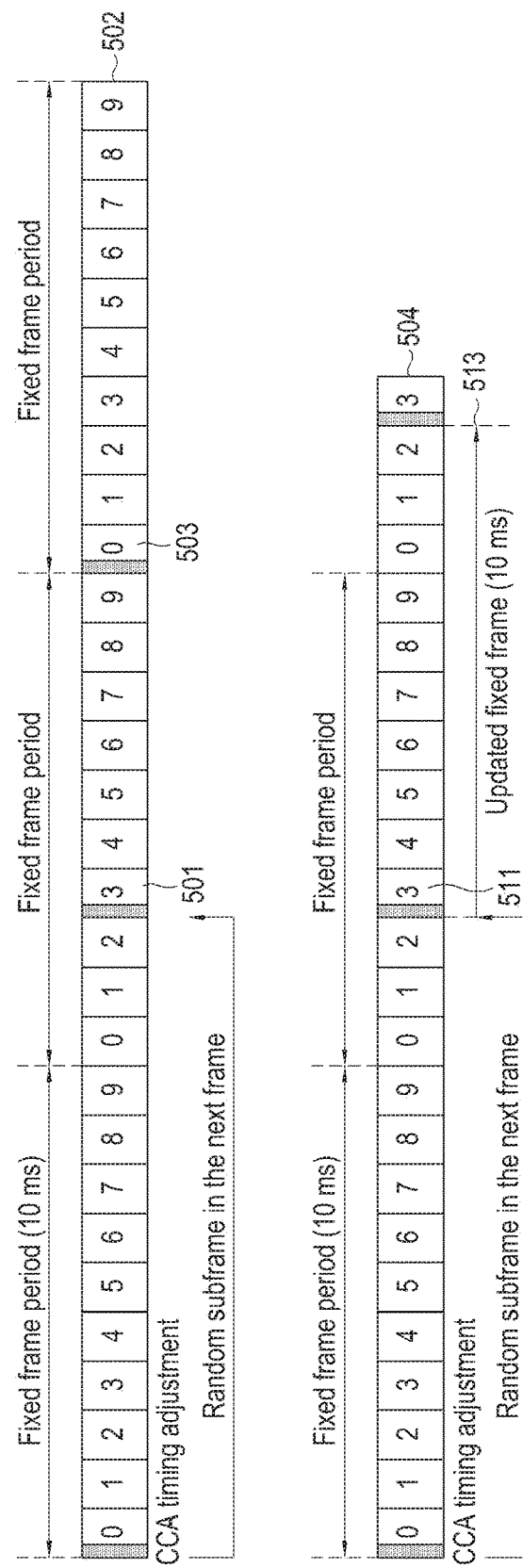
FIG. 5 is a view for explaining a method of randomizing CCA timing at a sub-frame level according to an embodiment of the present disclosure.

FIG. 5 is a view for explaining a method of randomizing CCA timing at a sub-frame level according to an embodiment of the present disclosure.

Referring to FIG. 5, it is assumed that a fixed frame period is 10 ms and an FBE-based LAA-LTE eNB performs CCA in the first (or first to n-th) symbol(s) of sub-frame #0. If the FBE-based LAA-LTE eNB is subject to the scheme 1-(a) and satisfies a performance timing condition according to the scheme (CCA timing adjustment) while performing CCA at a given time point, the FBE-based LAA-LTE eNB selects an arbitrary number. If the arbitrarily selected number is 3, the FBE-based LAA-LTE eNB does not perform CCA and transmission for the current fixed frame period, but performs CCA in the first (or first to n-th) symbol(s) of sub-frame #3 501 for the next fixed frame period and performs transmission according to the result obtained by performing the CCA, as illustrated in 502. Thereafter, the FBE-based LAA-LTE eNB sets a fixed frame period starting with sub-frame #3 511 to a new frame 513 and performs CCA in every sub-frame #3. Namely, the example of 502 corresponds to a method of updating a frame performing CCA based on an arbitrarily selected number.

There is a method of temporarily applying an arbitrarily selected number as in the example of 504, instead of updating a frame based on an arbitrarily selected number as in the example of 502. Namely, in 504, the FBE-based LAA-LTE eNB selects an arbitrary number if the FBE-based LAA-LTE eNB is subject to the scheme 1-(a) and satisfies a performance timing condition according to the scheme while performing CCA at a given time point. If the arbitrarily selected number is 3, the FBE-based LAA-LTE eNB does not perform CCA and transmission for the current fixed frame period, but performs CCA in the first symbol of sub-frame #3 511 for the next fixed frame period and performs transmission according to the result obtained by performing the CCA. Thereafter, the FBE-based LAA-LTE eNB returns to the original fixed frame period and performs CAA in every sub-frame #0 503. Namely, the example of 504 corresponds to a method of making a temporary frame based on an arbitrarily selected number to attempt CCA and transmission and returning to the original frame.

If the scheme 1-(a) is applied to all eNBs, it is possible to solve the problem in the related art that a particular eNB remains as a first eNB, which is an occupied eNB, to monopolize an unlicensed band, or a particular eNB remains as a second eNB, which is an unoccupied eNB, to fail to occupy the unlicensed band for a long period of time. This is because first and second eNBs may instantaneously exist, but the occupancy states of the eNBs may vary if CCA timing is continually changed every fixed or arbitrary time. If the scheme 1-(a) is applied to the first eNB, it may be construed that the first eNB probabilistically yields occupancy to the second eNB. Furthermore, if the scheme 1-(a) is applied to the second eNB, it may be construed that the second eNB probabilistically yields occupancy to the first eNB.

Scheme 1-(b). Randomize CCA timing at a symbol level.
  Target eNB: all eNBs or first or second eNB Time to perform randomization: varying according to target eNB New CCA time point: CCA timing randomization The scheme 1-(b) is almost the same as the scheme 1-(a). In the scheme 1-(b), the number arbitrarily selected by an eNB represents a symbol rather than a sub-frame to perform CCA for the next fixed frame period.

Figure 6:
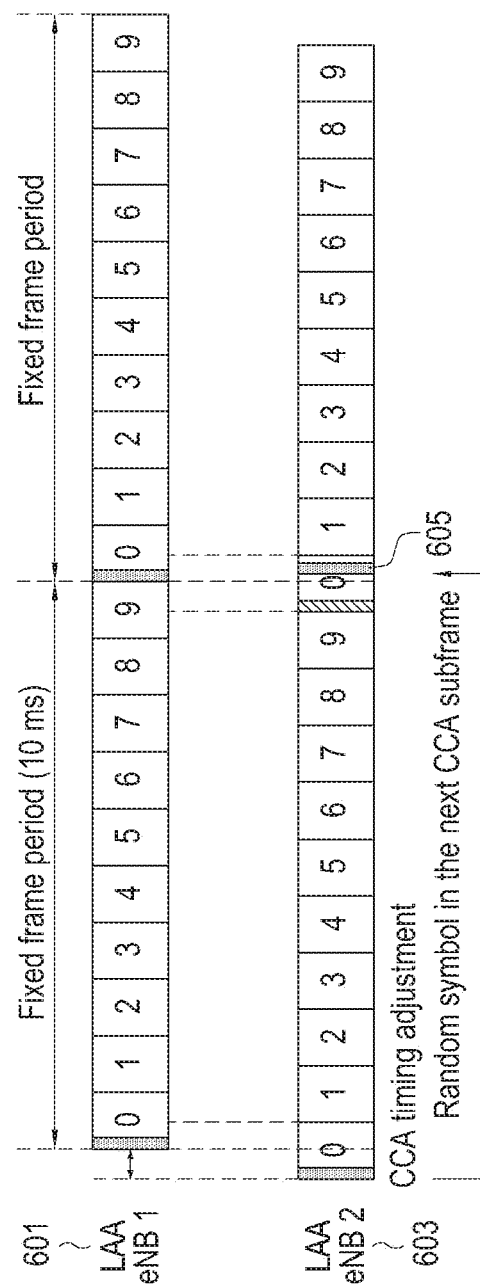
FIG. 6 is a view for explaining a method of randomizing CCA timing at a symbol level according to an embodiment of the present disclosure.

FIG. 6 is a view for explaining a method of randomizing CCA timing at a symbol level according to an embodiment of the present disclosure.

Referring to FIG. 6, the reason why the scheme 1-(b) is required is as follows. Assuming that a synchronization error between a first eNB 603 and a second eNB 601 is smaller than one sub-frame, the precedence relationship between time points when the first eNB 603 and the second eNB 601 perform CCA may be varied only by changing a symbol to perform CCA in the same sub-frame. In this case, it is possible to solve a problem of an FBE method by changing the symbol to perform CCA while fixing a sub-frame to perform CCA.

It is assumed that a fixed frame period is 10 ms and an FBE-based LAA-LTE eNB performs CCA in the first (or first to n-th) symbol(s) of sub-frame #0. If the first eNB 603 is subject to the scheme 1-(b) and satisfies a performance timing condition according to the scheme (CCA timing adjustment) while performing CCA at a given time point, the first eNB 603 selects an arbitrary number. If the arbitrarily selected number is 6, the first eNB 603 does not perform CCA and transmission for the current fixed frame period, but performs CCA in the sixth (or sixth to (6+n−1)th) symbol(s) 605 of sub-frame #0 for the next fixed frame period and performs transmission according to the result obtained by performing the CCA. Thereafter, the first eNB sets a fixed frame period starting with the sixth (or sixth to (6+n−1)th) symbol(s) of sub-frame #0 to a new frame and performs CCA in every sixth (or sixth to (6+n−1)th) symbol of sub-frame #0. Furthermore, after the first eNB 603 selects 6 as the arbitrary number, the first eNB 603 does not perform CCA and transmission for the current fixed frame period, but performs CCA in the sixth (or sixth to (6+n−1)th) symbol(s) of sub-frame #0 for the next fixed frame period and performs transmission according to the result obtained by performing the CCA. Then, the first eNB 603 may return to the original fixed frame period to perform CCA in every first (or first to n-th) symbol(s) of sub-frame #0.

Scheme 2. Search for CCA timing.

Target eNB: second eNB

Execution time point: when CCA continually fails K times or when CCA fails by X % or more for time T New CCA time point: CCA timing search The scheme 2 is similar to the scheme 1-(a) and the scheme 1-(b), but is a method specific to the second eNB which is an unoccupied eNB. In the scheme 1-(a) and the scheme 1-(b), the eNB selects new CCA timing by selecting an arbitrary number. This does not guarantee that the roles of the first and second eNBs will be necessarily changed although the roles of the first and second eNBs may be probabilistically changed. Accordingly, the scheme 2 allows the second eNB to search for and select CCA timing, which is in a clear state, by itself such that the second eNB may necessarily occupy an unlicensed band if possible.

Figure 7:
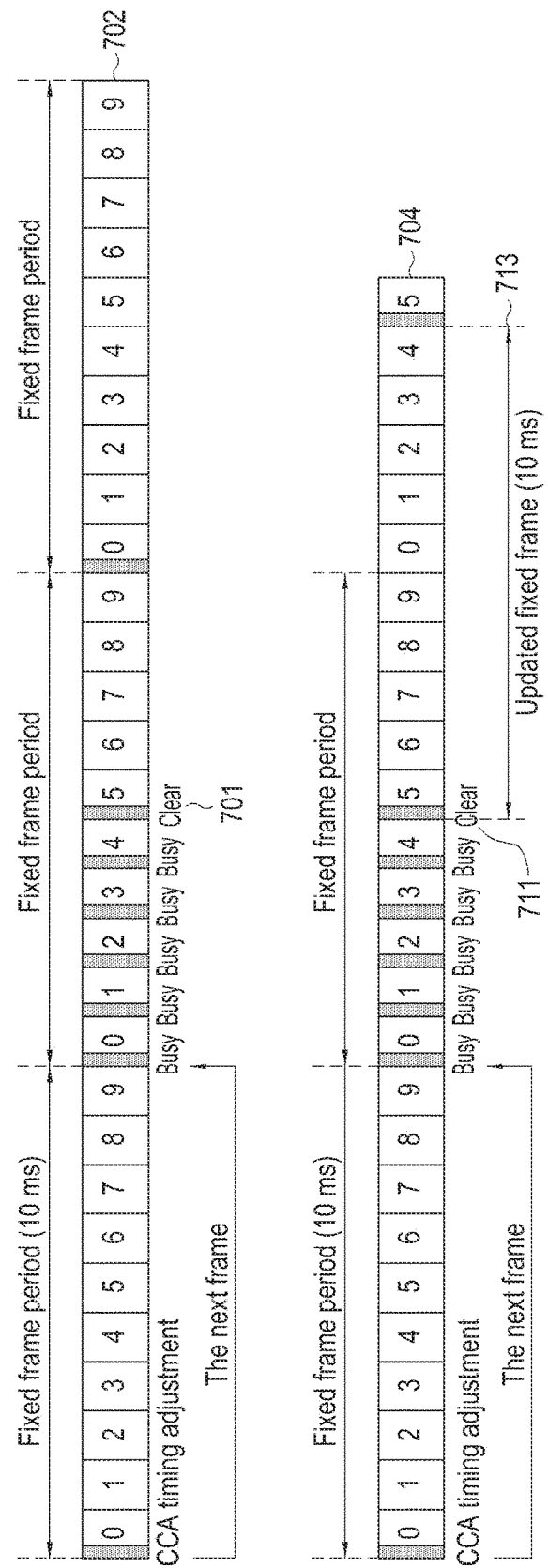
FIG. 7 is a view for explaining a method of searching for CCA timing according to an embodiment of the present disclosure.

FIG. 7 is a view for explaining a method of searching for CCA timing according to an embodiment of the present disclosure.

Referring to FIG. 7, 702 illustrates an example of a CCA timing search method in which a frame update is not performed, and 704 illustrates an example of a CCA timing search method in which a frame update is performed.

In FIG. 7, it is assumed that a fixed frame period is 10 ms and an FBE-based LAA-LTE eNB performs CCA in sub-frame #0. If the FBE-based LAA-LTE eNB is subject to the scheme 1 and satisfies a performance timing condition according to the scheme (i.e., when the FBE-based LAA-LTE eNB continually fails in CCA K times as a second eNB or fails in CCA by a predetermined rate (X %) or more for time T) while performing CCA at a given time point (CCA timing adjustment), the second eNB does not perform CCA and transmission for the current fixed frame period, but performs CCA in sub-frame #0 for the next fixed frame period. If the second eNB succeeds in CCA, the second eNB performs transmission from the corresponding sub-frame, and if not, the second eNB retries CCA in the next sub-frame. The second eNB performs transmission if the CCA succeeds and repeatedly retries CCA if not. Namely, in this embodiment, the second eNB searches for suitable CCA timing while performing CCA in every sub-frame. If the second eNB fails to find suitable CCA timing (i.e., a CCA opportunity to find a clear channel) for L fixed frame periods, the second eNB may maintain the current CCA time point or may perform another operation, for example, an operation of changing an operating frequency.

In the scheme 2, the fixed frame period may be updated or maintained after suitable CCA timing is found, as in the scheme 1-(a) and the scheme 1-(b). Here, 704 illustrates an example in which the second eNB updates the fixed frame period from the corresponding sub-frame to a new frame 713 after finding suitable CCA timing 711. Here, 702 illustrates an example in which the second eNB finds suitable CCA timing 701 and then returns to the original fixed frame period without continually maintaining the found CCA timing 701.

Scheme 3. Randomize an ON/OFF period of CCA.

Target eNB: all eNBs or first or second eNB

Time to perform randomization: varying according to target eNB

New CCA time point: ON/OFF period randomization

The scheme 3 is a method of applying ON/OFF of CCA in units of fixed frame periods and randomizing the lengths of an ON period and an OFF period. According to this method, CCA is performed in a predetermined sub-frame and symbol every fixed frame period during the ON period, and CCA is not performed during the OFF period. Accordingly, it is possible to solve the problem that a particular eNB, the CCA time point of which is earlier than that of the other eNB, may monopolize an unlicensed band in an FBE-based LAA-LTE system since the period between two CCAs corresponds to a fixed frame period or the length of the OFF period, and the lengths of the ON/OFF periods are random.

Figure 8:
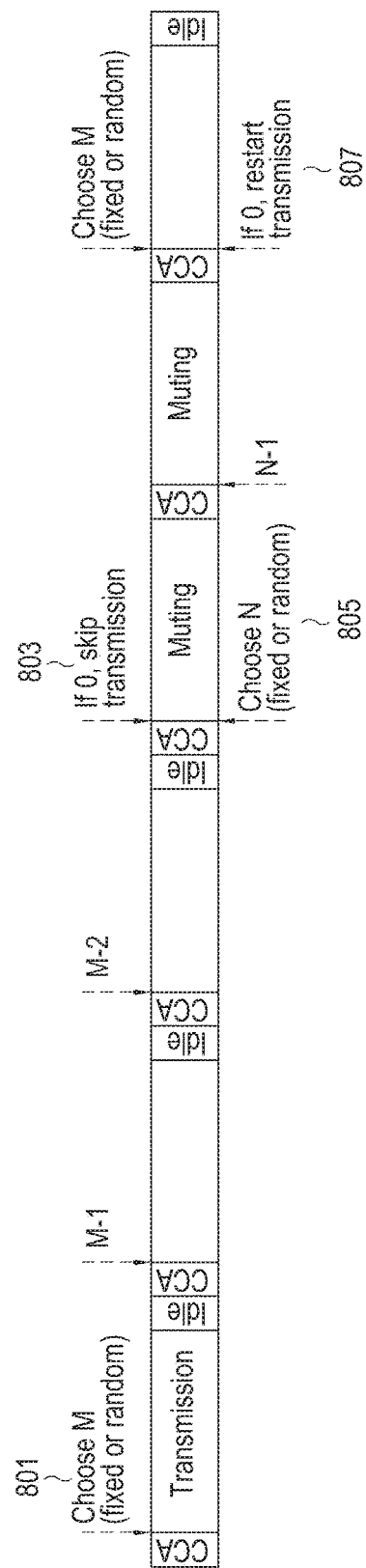
FIG. 8 is a view for explaining a method of randomizing ON/OFF periods of CCA according to an embodiment of the present disclosure.

FIG. 8 is a view for explaining a method of randomizing ON/OFF periods of CCA according to an embodiment of the present disclosure.

Referring to FIG. 8, it is assumed that a sub-frame and a symbol for performing CCA within a fixed frame period are fixed in the scheme 3. If an eNB has found a clear channel by performing CCA, the eNB may perform transmission through an unlicensed band for the corresponding fixed frame period. In addition, the eNB selects an arbitrary number M in order to determine the length of an ON period of CCA at 801. This means that the eNB will enter an OFF period after succeeding in CCA and performing transmission M times. Accordingly, the eNB decreases M by 1 whenever succeeding in CCA and enters the OFF period when M is equal to 0 at 803. While entering the OFF period, the eNB selects an arbitrary number N in order to determine the length of the OFF period at 805. This means that the eNB will maintain the OFF period for N fixed frame periods. Accordingly, the eNB does not perform CCA and transmission for the corresponding OFF period, but enters the ON period again to perform CCA and transmission when the OFF period ends at 807.

In the embodiment of FIG. 8, it has been described that the parameter M for determining the length of the ON period and the parameter N for determining the length of the OFF period are all arbitrarily configured. However, the parameter M may be arbitrarily configured, and the parameter N may be configured to be fixed in a case where only the ON period is randomized. In another embodiment, the parameter M may be configured to be fixed, and the parameter N may be arbitrarily configured in a case where only the OFF period is randomized.

Hereinafter, embodiments of the present disclosure for enhancing fairness in a time-division duplex (TDD)-based LAA-LTE will be described.

A TDD frame structure for a downlink (DL) period and an uplink (UL) period in a TDD-based LAA-LTE in this embodiment is summarized as in Table 2 below.

TABLE 2

|  | DL period | UL period |
|---|---|---|
| Regulation | Operating based on LBE | Operating based on FBE |
| Channel reservation | Transmitted | Not transmitted |
| Feature | Enhancing possibility of channel occupancy | Supporting multi-user scheduling |

Figure 9A:
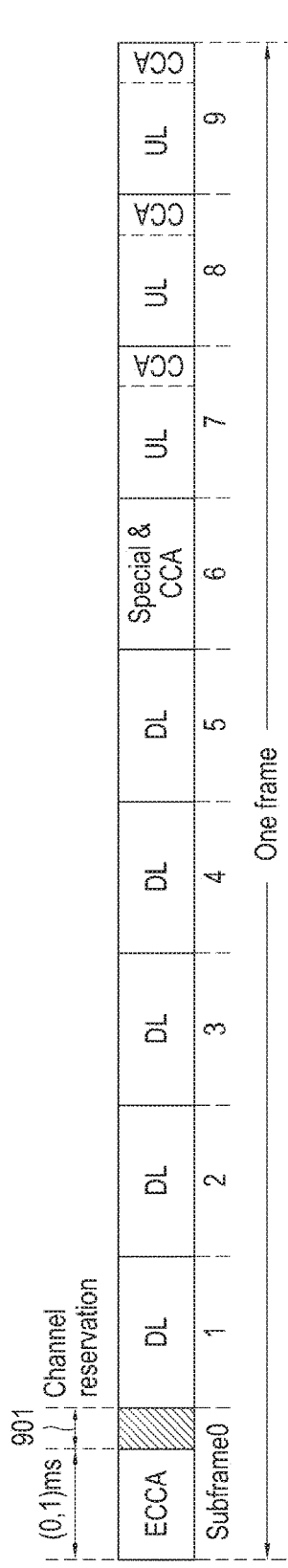
FIG. 9A illustrates a time-division duplex (TDD) frame structure for a downlink (DL) period and an uplink (UL) period in a TDD-based LAA-LTE according to an embodiment of the present disclosure.

FIG. 9A illustrates a TDD frame structure for a DL period and an UL period in a TDD-based LAA-LTE according to an embodiment of the present disclosure.

Referring to FIG. 9A, an operation is performed based on LBE for the DL period from an eNB to a UE, and an operation is performed based on FBE for the UL period from the UE to the eNB. In the example of FIG. 9A, LBE may reserve a part of the first sub-frame (sub-frame #0) 901 and may transmit PDCCH and data from the second sub-frame (sub-frame #1). Further, in the frame structure of FIG. 9A, a special sub-frame that includes a protective period exists between the DL period and the UL period.

Figure 9B:
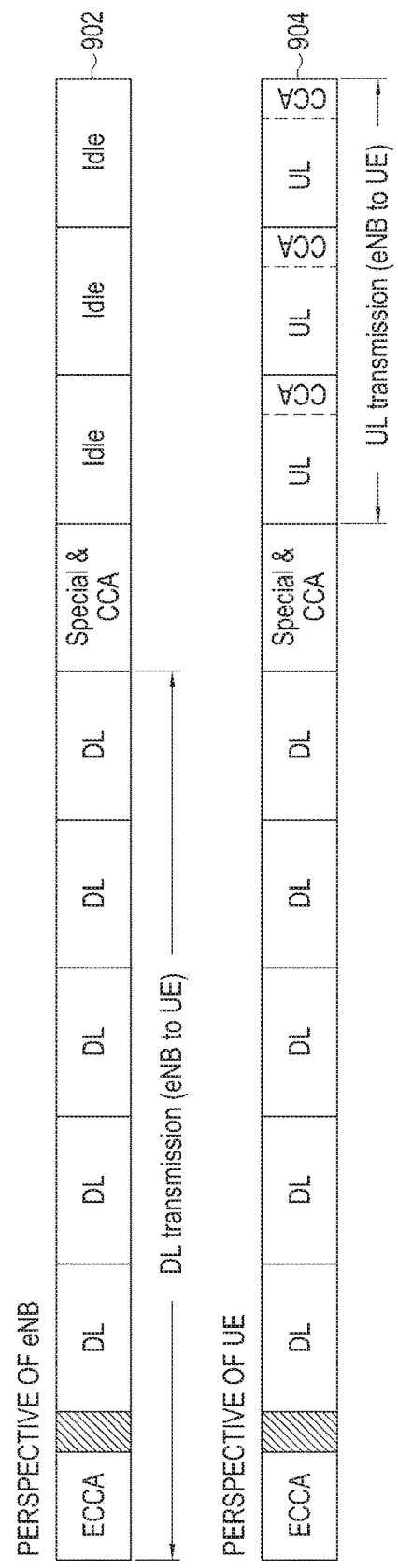
FIG. 9B illustrates DL and UL transmission in a frame structure of a TDD-based LAA-LTE according to an embodiment of the present disclosure.

FIG. 9B illustrates DL and UL transmission in a frame structure of a TDD-based LAA-LTE according to an embodiment of the present disclosure.

Referring to FIG. 9B, 902 illustrates DL transmission in view of an eNB, and 904 illustrates UL transmission in view of a UE.

When synchronization between eNBs is harmonized in the TDD-based LAA-LTE, fair competition may be performed between the eNBs. In this case, as in the example of FIG. 10, the eNBs may independently perform CCA, and when multiple eNBs succeed in the CCA at the same time, the eNBs can achieve frequency reuse 1, thereby enhancing the spectral efficiency of the LAA-LTE. An eNB that selects a small random number when performing ECCA may occupy a channel for a DL period and may achieve frequency reuse 1 for an UL period.

However, the eNBs have difficulty in performing fair competition in a case where synchronization between the eNBs is not harmonized in the TDD-based LAA-LTE.

Figure 11:
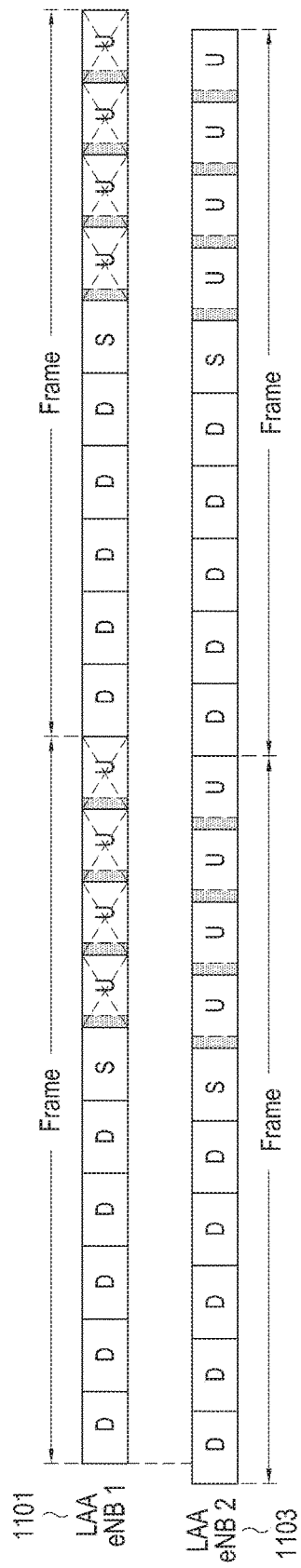
FIG. 11 illustrates a case in which synchronization between eNBs is not harmonized in a TDD-based LAA-LTE according to an embodiment of the present disclosure.

FIG. 11 illustrates a case in which synchronization between eNBs is not harmonized in a TDD-based LAA-LTE according to an embodiment of the present disclosure.

Referring to FIG. 11, a case is shown that represents a problem that happens when two eNBs 1101 and 1103 have different sub-frame synchronizations. In this case, if the CCA execution time point of each of the eNBs 1101 and 1103 is fixed, the particular eNB 1103 always performs CCA first. This may be considered to be unfair since the particular eNB 1103 has a priority in terms of channel occupancy.

Embodiments of the present disclosure propose methods for solving the unfairness in the example of FIG. 11.

Figure 12A:
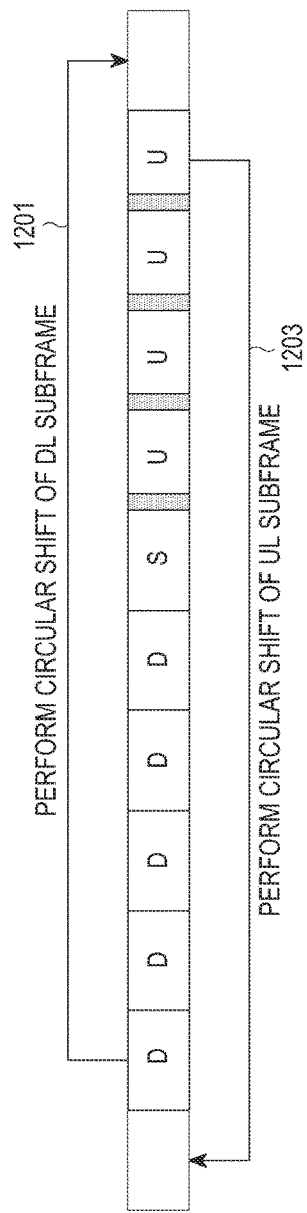
FIGS. 12A and 12B are views for explaining a method of performing a circular shift of a TDD sub-frame configuration in units of sub-frames according to various embodiments of the present disclosure.
Figure 12B:
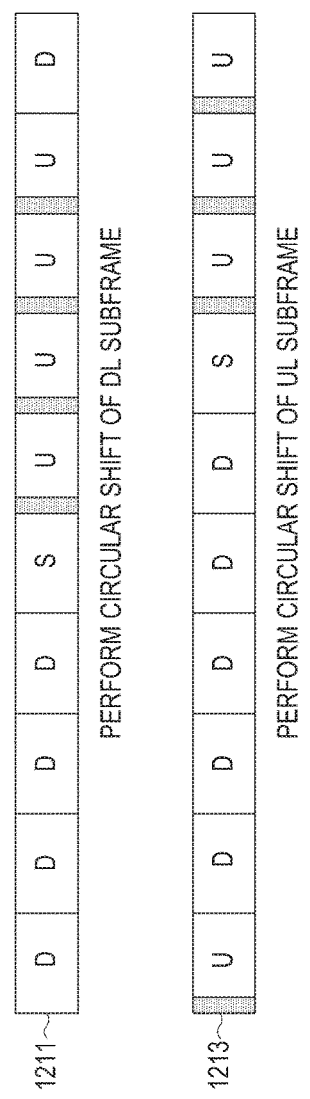

FIGS. 12A and 12B are views for explaining a method of performing a circular shift of a TDD sub-frame configuration in units of sub-frames according to various embodiments of the present disclosure.

Figure 13:
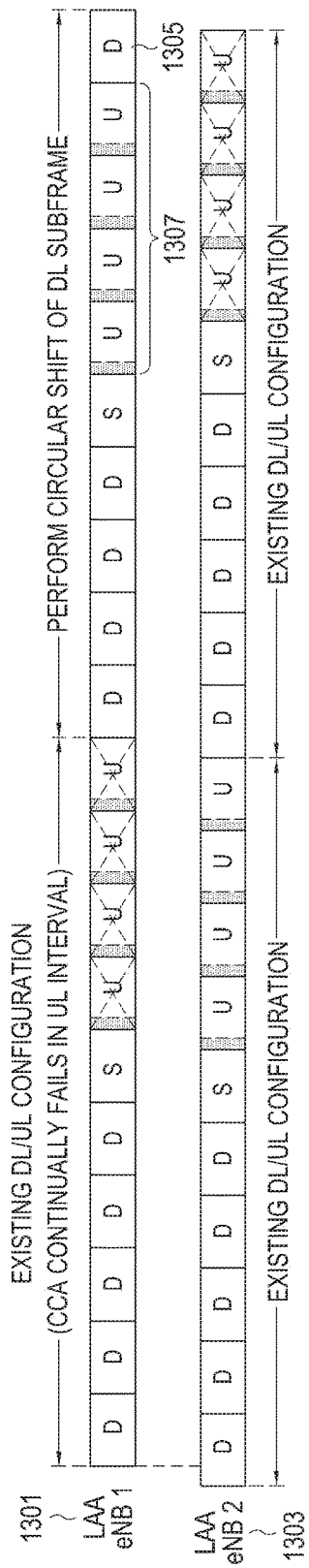
FIGS. 13, 14, 15 and 16 are views for explaining methods for providing fairness in a TDD-based LAA-LTE according to various embodiments of the present disclosure.

FIG. 13 is a view for explaining a method for providing fairness in a TDD-based LAA-LTE according to an embodiment of the present disclosure.

Referring first to FIG. 13, it is assumed that two eNBs 1301 and 1303 have different sub-frame synchronizations. FIG. 13 illustrates a method of shifting a TDD sub-frame configuration in units of sub-frames. For example, the eNB 1301 that continually fails to occupy a channel shifts one or n DL sub-frames to the tail end at 1305. This exhibits the same effect as moving an UL sub-frame to the front at 1307 so that it is possible to partly solve unfairness.

Furthermore, referring to FIGS. 12A and 12B, reference numeral 1201 represents that an eNB that fails to occupy a channel performs a circular shift of one DL sub-frame to the tail end (in the direction of an arrow). The shifted TDD sub-frame configuration is indicated by reference numeral 1211.

Figure 14:
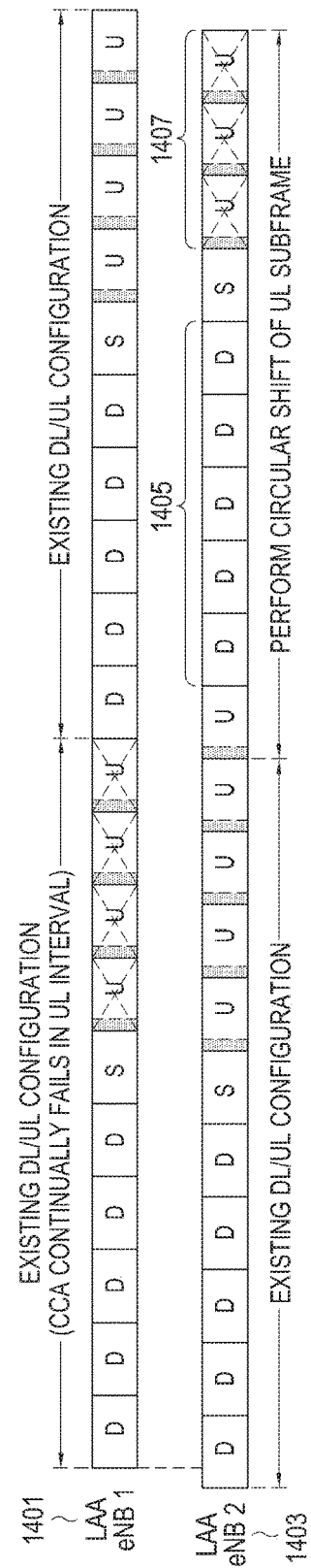

FIG. 14 is a view for explaining a method for providing fairness in a TDD-based LAA-LTE according to an embodiment of the present disclosure.

Referring to FIG. 14, it is assumed that two eNBs 1401 and 1403 have different sub-frame synchronizations. FIG. 14 illustrates another method of shifting a TDD sub-frame configuration in units of sub-frames. The eNB 1403 that continually occupies a channel shifts one or n DL sub-frames to the rear at 1405. This exhibits the same effect as shifting an UL sub-frame to the rear at 1407 so that it is possible to partly solve unfairness.

Furthermore, referring again to FIGS. 12A and 12B, reference numeral 1203 represents that an eNB that occupies a channel performs a circular shift of one UL sub-frame to the head (in the direction of an arrow). The shifted TDD sub-frame configuration is indicated by reference numeral 1213.

Figure 15:
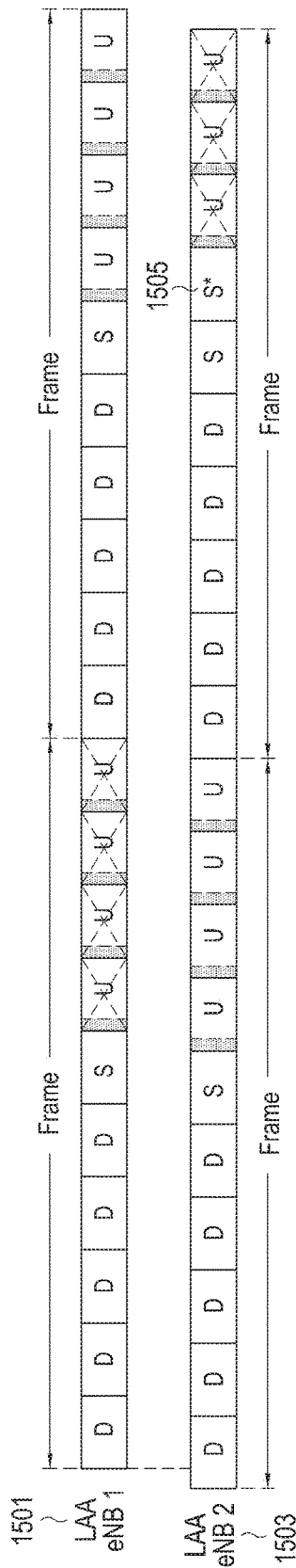

FIG. 15 is a view for explaining a method for providing fairness in a TDD-based LAA-LTE according to an embodiment of the present disclosure.

Referring to FIG. 15, it is assumed that two eNBs 1501 and 1503 have different sub-frame synchronizations. In the method of FIG. 15, the eNB that continually occupies a channel replaces one UL sub-frame with an additional special sub-frame 1505 while maintaining a TDD configuration (the number and positions of DL and UL sub-frames) as it is. This may be understood as an operation in which the eNB 1503 that continually occupies a channel yields a channel occupancy opportunity to the eNB 1501 that continually fails to occupy a channel due to the eNB 1503. In FIG. 15, a basic special sub-frame is indicated by "S", and an additional special sub-frame is indicated by "S*".

Figure 16:
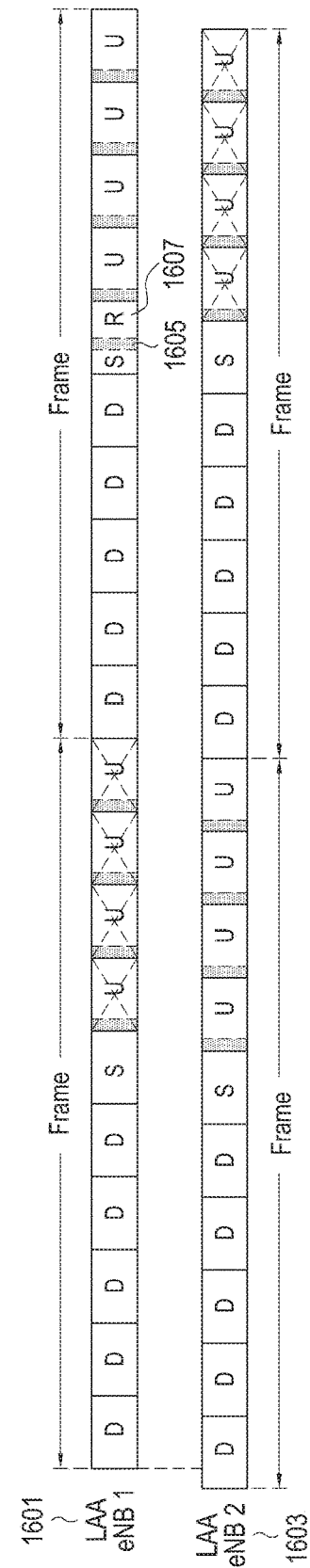

FIG. 16 is a view for explaining a method for providing fairness in a TDD-based LAA-LTE according to an embodiment of the present disclosure.

Referring to FIG. 16, it is assumed that two eNBs 1601 and 1603 have different sub-frame synchronizations. In the method of FIG. 16, the eNB 1601 that continually fails to occupy a channel transmits a reservation signal 1607 to the upcoming UL sub-frame boundary if the eNB founds a clear channel after temporarily performing CCA in an arbitrary symbol 1605 within a special sub-frame (or in the position of a symbol in which CCA succeeds as is the case of DL). The proposed method of FIG. 16 corresponds to a method in which the eNB 1601 that continually fails to occupy a channel attempts channel occupancy by temporarily advancing the CCA time point. In FIG. 16, the reservation signal 1607 transmitted according to the result obtained by performing the CCA in the arbitrary symbol 1605 within the special sub-frame is indicated by "R".

Figure 17:
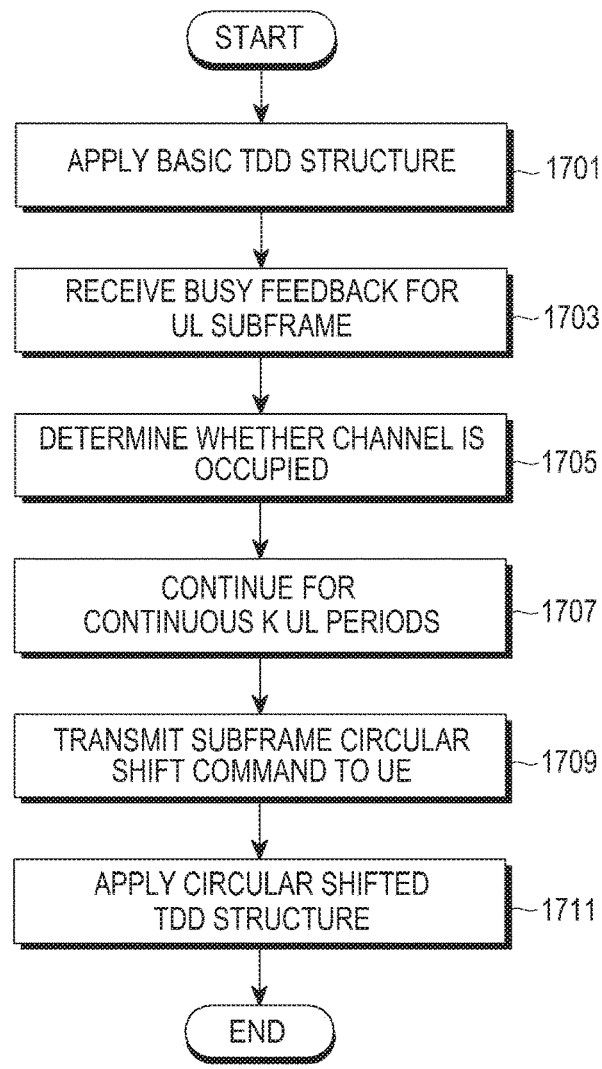
FIG. 17 is a flowchart illustrating a method for providing, by an eNB, fairness in a TDD-based LAA-LTE according to an embodiment of the present disclosure.

FIG. 17 is a flowchart illustrating a method for providing, by an eNB, fairness in a TDD-based LAA-LTE according to an embodiment of the present disclosure. It is assumed that CCA is performed based on LBE for a DL period and CCA is performed based on FBE for an UL period.

Referring to FIG. 17, in operation 1701, the eNB applies a basic TDD sub-frame configuration determined by a system. In operation 1703, the eNB receives busy feedback for an UL sub-frame from a UE in a case where the UE fails in CCA. Namely, the eNB receives the busy feedback from the UE that fails in the CCA. In operation 1705, the eNB determines whether a channel has been occupied for one UL period. When it is determined in operation 1707 that the channel occupancy or non-occupancy has continued for predetermined K UL periods, the eNB transmits a sub-frame circular shift command to the UE in operation 1709. Further, the eNB applies the circular shifted TDD sub-frame configuration in operation 1711. Here, the circular shift may be performed using one of the methods described with reference to FIGS. 12 to 16.

According to the methods of FIGS. 12 to 17, in a case where there is an eNB that continually occupies a channel for an UL period during which an operation is performed based on FBE, the eNB may perform a circular shift of the TDD sub-frame configuration in units of sub-frames, thereby enhancing fairness.

Figure 20:
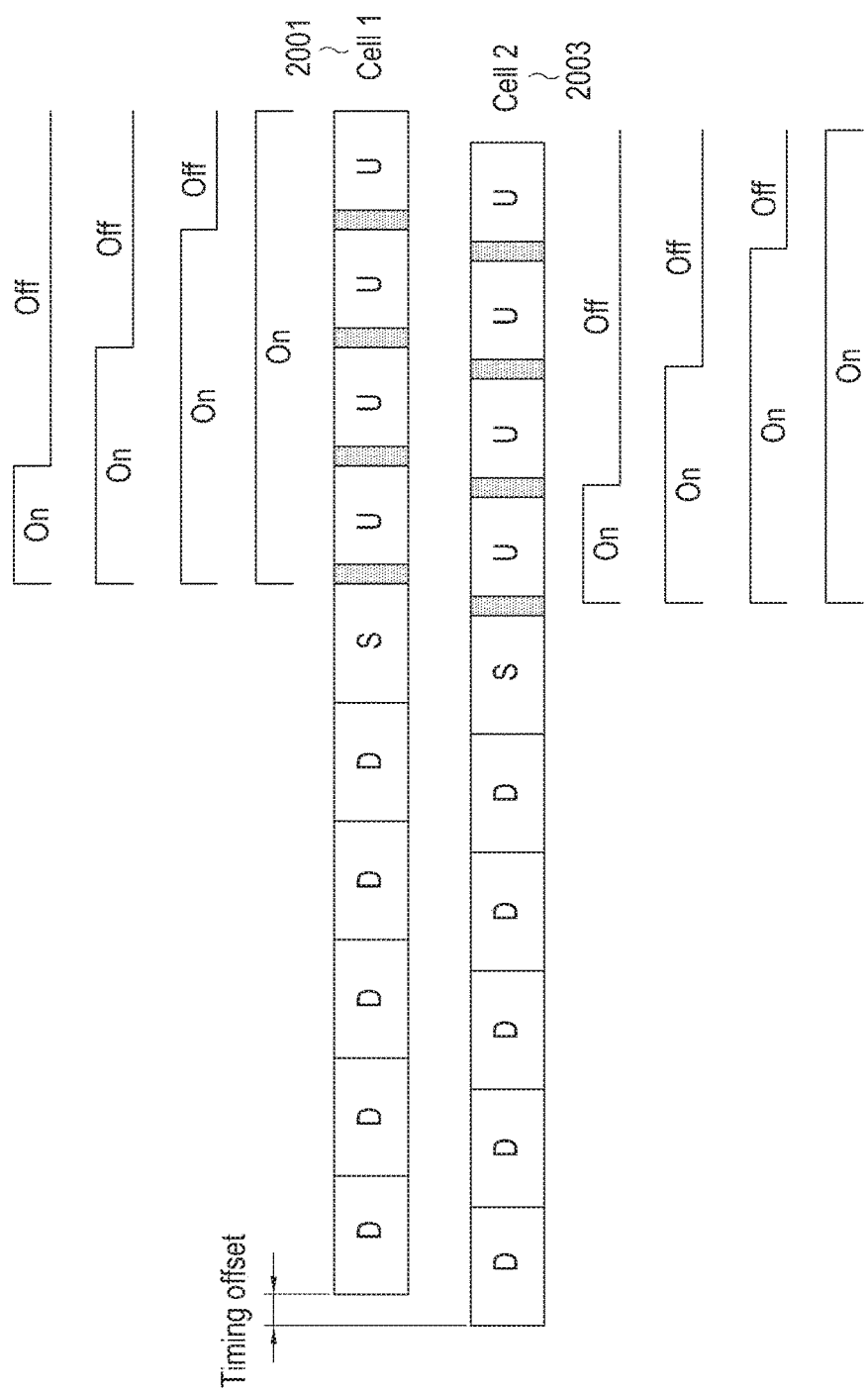
FIG. 20 is a view for explaining a method for providing fairness while maintaining a basic TDD sub-frame configuration in a TDD-based LAA-LTE according to an embodiment of the present disclosure.
Figure 21:
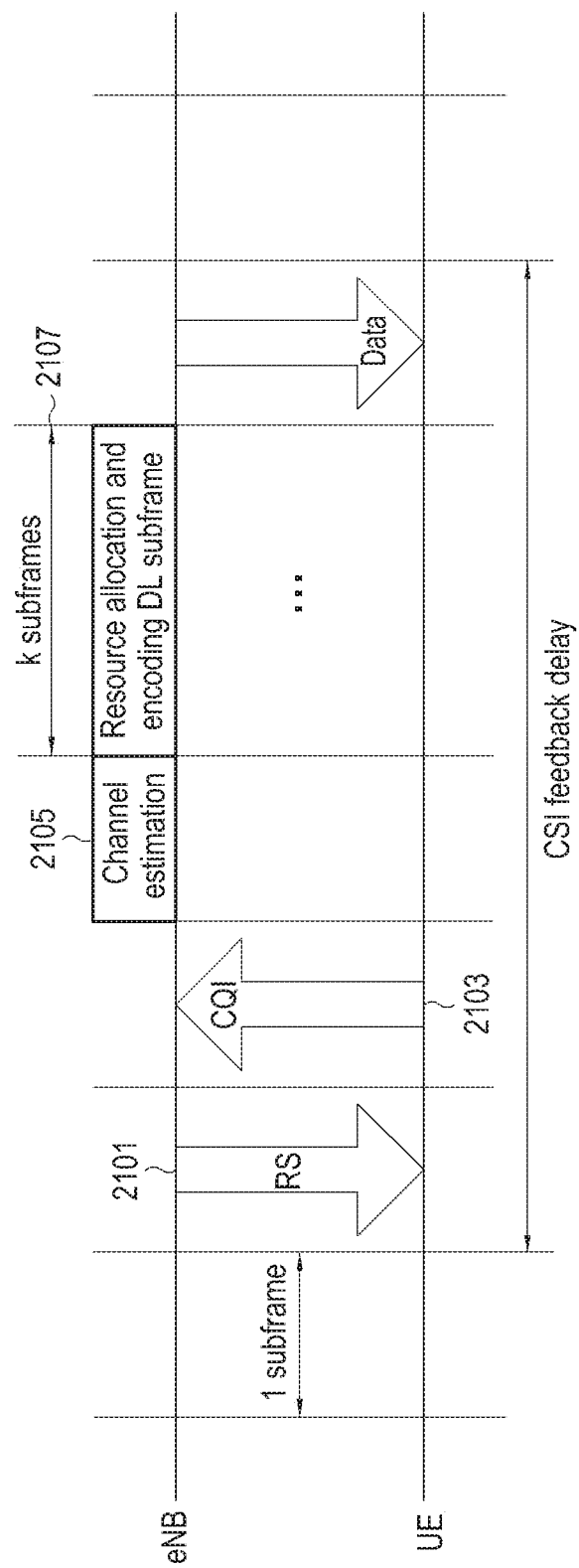
FIG. 21 is a view for explaining a channel state information (CSI) feedback delay in a wireless communication system.

FIG. 20 is a view for explaining a method for providing fairness while maintaining a basic TDD sub-frame configuration in a TDD-based LAA-LTE according to an embodiment of the present disclosure.

Referring to FIG. 20, a method is shown in which first and second Cells 2001 and 2003 provide fairness by randomizing ON/OFF of at least one UL period while maintaining a basic TDD sub-frame configuration. While FIG. 20 shows the ON/OFF of the UL period, the method of FIG. 20 may also be identically applied to a DL period.

Figure 18:
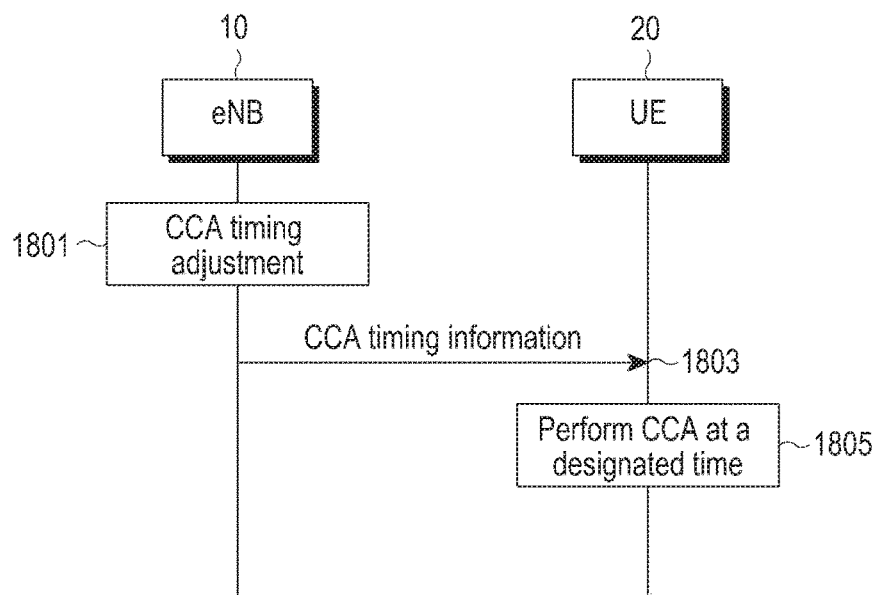
FIGS. 18 and 19 illustrate signaling methods between an eNB and a UE for CCA timing control in a TDD-based LAA-LTE according to various embodiments of the present disclosure.

FIG. 18 illustrates a signaling method between an eNB and a UE for CCA timing control in a TDD-based LAA-LTE according to an embodiment of the present disclosure.

Referring to FIG. 18, an eNB 10 determines DL or UL CCA timing according to the above-described embodiments in operation 1801 and transmits information on the determined CCA timing to a UE 20 in operation 1803. The information on the CCA timing may be transmitted using a downlink control indicator (DCI) message that is transmitted through a PDCCH, or through an RRC connection reconfiguration message that is transmitted through a PDSCH. Thereafter, in operation 1805, the UE 20 that has received the information on the CCA timing performs CCA at the determined CCA timing.

Figure 19:
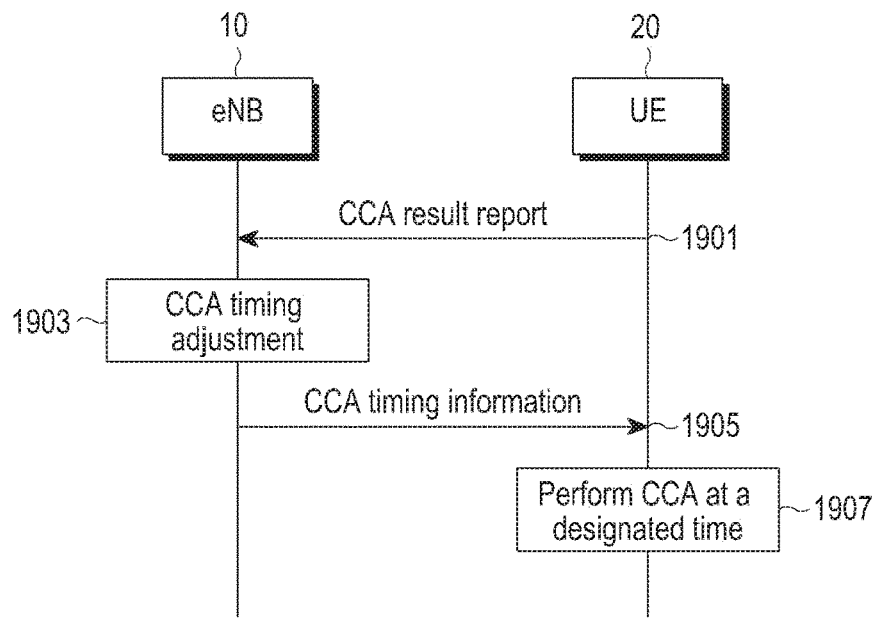

FIG. 19 illustrates another signaling method between an eNB and a UE for CCA timing control in a TDD-based LAA-LTE according to an embodiment of the present disclosure.

Referring to FIG. 19, the UE 20 reports a CCA result to the eNB 10 in operation 1901, and the eNB 10 that has received the CCA result report determines DL or UL timing according to the above-described embodiments in operation 1903 and transmits information on the determined CCA timing to the UE 20 in operation 1905. The information on the CCA timing may be transmitted using a DCI message that is transmitted through a PDCCH, or through an RRC connection reconfiguration message that is transmitted through a PDSCH. Thereafter, in operation 1907, the UE 20 that has received the information on the CCA timing performs CCA at the determined CCA timing.

Table 3 and Table 4 below represent an example of the configuration of a DCI message (for example, DCT format1) that may be used when the eNB 10 transmits the information on the DL or UL CCA timing to the UE 20. While the configuration of the DCI message is divided into Table 3 and Table 4 for the convenience of illustration, Table 3 and Table 4 may be understood as one table representing the configuration of the DCI message.

TABLE 3

| Field name | Length (bits) | Comment |
| --- | --- | --- |
| Resource allocation header | 1 | RA type 0 or RA type 1 |
| Resource block assignment for RA type 0 | 6 (1.4 MHz)<br>8 (3 MHz)<br>13 (5 MHz)<br>17 (10 MHz)<br>19 (15 MHz)<br>25 (20 MHz) | Applicable only when resource allocation header = 0 (RA type 0) |
| Subset | N/A (1.4 MHz)<br>1 (3 MHz)<br>1 (5 MHz)<br>2 (10 MHz)<br>2 (15 MHz)<br>2 (20 MHz) | Applicable only when resource allocation header = 1 (RA type 1) |
| Shift | N/A (1.4 MHz)<br>1 (3 MHz)<br>1 (5 MHz)<br>1 (10 MHz)<br>1 (15 MHz)<br>1 (20 MHz) | Applicable only when resource allocation header = 1 (RA type 1) |

TABLE 4

| Field name | Length (bits) | Comment |
| --- | --- | --- |
| Resource block assignment for RA type 1 | N/A (1.4 MHz)<br>6 (3 MHz)<br>13 (5 MHz)<br>14 (10 MHz)<br>16 (15 MHz)<br>22 (20 MHz) | Applicable only when resource allocation header = 1 (RA type 1) |
| MCS | 5 | |
| HARQ process | 3 (FDD)<br>4 (TDD) | |
| RV | 2 | |
| TPC for PUCCH | 2 | |
| DL CCA timing | N-th symbol of M-th sub-frame within L-th frame | |
| DL CCA period | $T_{DL}$ sub-frame | Applicable when eNB periodically performs |

TABLE 4-continued

| Field name | Length (bits) | Comment |
| --- | --- | --- |
| UL CCA timing | N'-th symbol of M'-th sub-frame within L'-th frame | CCA for DL transmission |
| UL CCA period | $T_{UL}$ sub-frame | Applicable when UE periodically performs CCA for UL transmission |

Furthermore, in an embodiment of the present disclosure, the UE transmits a CCA result for performing UL transmission to inform the eNB whether an unfair situation, as illustrated in FIG. 11, happens. The CCA result may be transmitted from the UE to the eNB through a PUCCH through which SR, CQI, PMI, RI, HARQ ACK/NACK information is fed back in an LTE system, and may be transmitted through an RRC message that is the same as a measurement report. Specifically, when a PUCCH transmission condition that includes the CCA result below, or a measurement report transmission condition that includes the CCA result, is satisfied, each UE may transmit a PUCCH or measurement report that includes the CCA result.

PUCCH Transmission Condition Including CCA Result

1) When a busy channel is found every time CCA is performed, a 1-bit indicator (1: busy, 0: clear) is transmitted through a PUCCH.

2) When the number of times that a busy channel is found for a predetermined period of time exceeds X %, a 1-bit indicator (1: busy, 0: clear) is transmitted through a PUCCH.

Measurement Report Transmission Condition Including CCA Result

1) When a busy channel is continually found K times for a predetermined period of time, a 1-bit indicator (1: busy, 0: clear) is transmitted through a measurement report.

2) When the number of times that a busy channel is found for a predetermined period of time exceeds X %, the frequency or absolute value of the busy channel found by a UE is transmitted through a measurement report.

Hereinafter, a method of efficiently performing channel quality report in a wireless communication system that shares resources by an FBE or LBE method in a shared band, such as an unlicensed band, and a link adaptation method will be described. Through these methods, high band efficiency may be expected in the present disclosure.

UE within the Region of an eNB is in an RRC IDLE State or in an RRC CONNECTED State 1) RRC IDLE state: The UE selects an eNB (or Cell), monitors a Paging Channel, and acquires System Information (SI), but does not exchange data with the eNB.

2) RRC CONNECTED state: The UE monitors a Control Channel and exchanges data with the eNB through a data channel. The UE reports various measurement results of the eNB and a surrounding eNB to help scheduling of the eNB.

Embodiments of the present disclosure propose the following methods A, B, and C in order to solve the three problems, which have been discussed in section "BACKGROUND", in applying an existing link adaptation technique in a shared band, such as an unlicensed band.

A. Link adaptation method based on channel quality report measured prior to resource allocation and data transmission B. Link adaptation method based on channel quality report measured at the time of data transmission after resource allocation C. Link adaptation method based on channel quality report measured between resource allocation and data transmission Further, there may be four cases according to whether a PCell or an Scell is used to perform a channel quality report for a reference signal or to perform ACK/NACK feedback for data transmission as shown in Table 5 below.

TABLE 5

| | Channel quality report | ACK/NACK feedback |
| --- | --- | --- |
| I-1 | PCell | PCell |
| I-2 | PCell | SCell |
| II-1 | SCell | PCell |
| II-2 | SCell | SCell |

When a channel quality report or ACK/NACK feedback is sent, different operations may be considered according to whether an LAA-LTE system is an FDD system or a TDD system. For example, in a case where the LAA-LTE system is an FDD system, since one band can be configured only with one of a downlink and an uplink, shared band 1 is basically configured for a downlink in a general scenario. Since shared band 2 has to be used to configure an uplink to be a shared band in the FDD system, an operation for simultaneous radio resource access to two or more shared bands has to be considered. Namely, an operation for two or more shared band frequencies has to be considered, but according to a Carrier Aggregation (CA) or HetNet operation of the current LTE standard, it is not easy to make a change to support the performance of LBT for multiple shared bands. In order to avoid this complex operation, an uplink may be performed through an existing PCell. In another example, in a case where the LAA-LTE system is a TDD system, since a downlink and an uplink can all be configured in one band, a channel measurement report or ACK/NACK feedback for a downlink sub-frame may be performed in an uplink sub-frame. However, since the rate of the uplink sub-frame is usually configured to be less than that of the downlink sub-frame, a delay in uplink transmission occurs by several sub-frames if resource acquisition fails in the uplink. If this problem is expected, it may be preferable to empty the uplink sub-frame or to transmit a reservation signal following a success in LBT for a predetermined period of time before the next downlink comes. In this way, a PCell has to perform uplink transmission as in the FDD system, instead of using the uplink sub-frame.

Figure 22A:
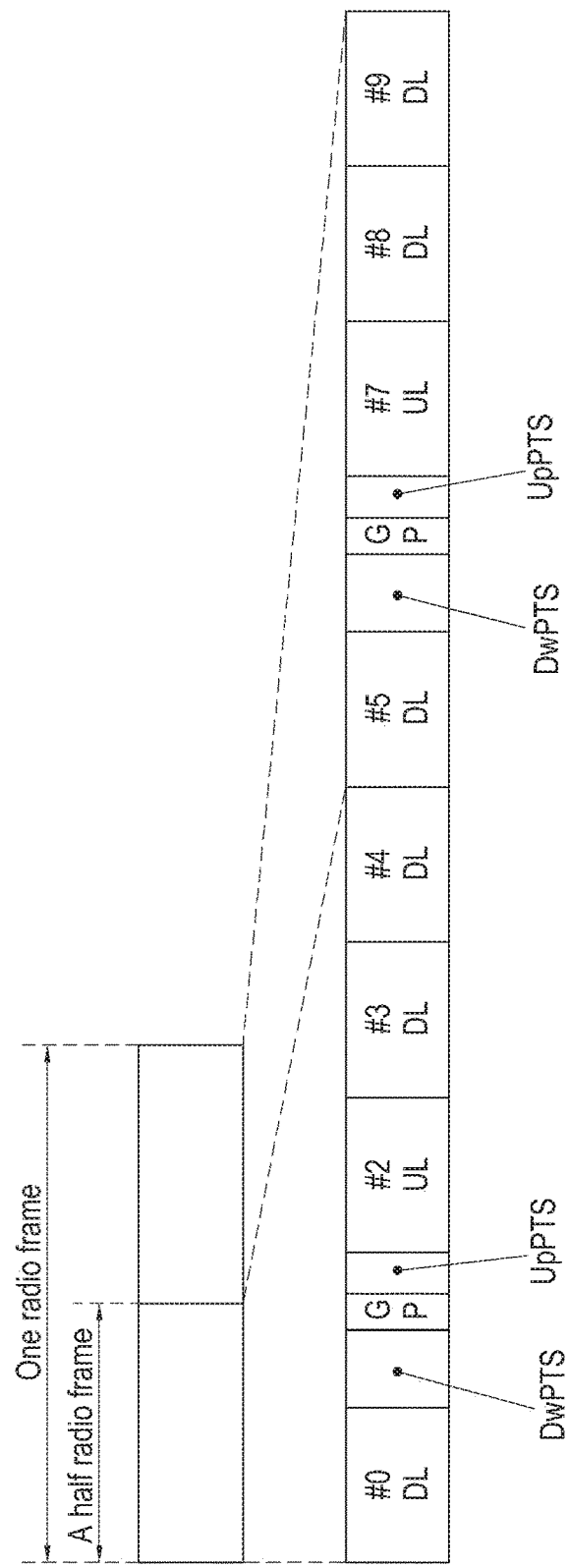
FIG. 22A illustrates a general TDD DL/UL frame structure in an LTE system according to an embodiment of the present disclosure.
Figure 22B:
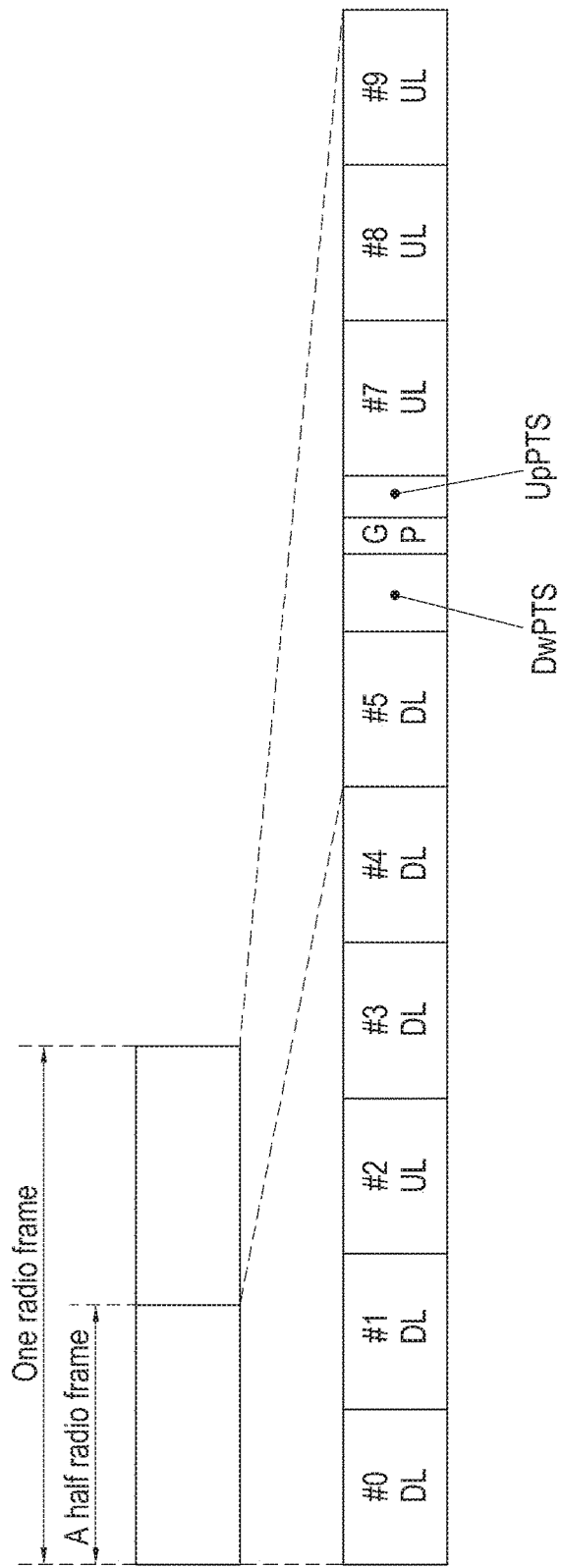
FIG. 22B illustrates a preferred TDD DL/UL frame structure for a shared band, such as an unlicensed band according to an embodiment of the present disclosure.

FIG. 22A illustrates a general TDD DL/UL frame structure in an LTE system and FIG. 22B illustrates a preferred TDD DL/UL frame structure for a shared band, such as an unlicensed band, according to various embodiments of the present disclosure.

Link adaptation techniques proposed in embodiments of the present disclosure are as follows.

[A. Link Adaptation Method Based on Channel Quality Report Measured Prior to Resource Allocation and Data Transmission]

As mentioned above, a channel occupancy method in an LAA-LTE system may be broadly divided into an FBE method and an LBE method according to the LBT regulation. The LBT regulation is identically applied without distinction between an eNB and a UE. While a link adaptation technique is illustratively described for a downlink transmitted by an eNB in an embodiment of the present disclosure, an application to an uplink is also considered. In an example of a frame structure of the present disclosure, a data region may be allocated to both a downlink and an uplink. Although omitted in the frame structure, a gap in time required for Tx-Rx conversion has to be usually prescribed in order to transmit an uplink signal after transmitting a downlink signal. According to situations, CCA may be performed using the gap.

In a downlink of the FBE method, CCA is performed at the start of a particular period (for example, a sub-frame), and if the CCA succeeds, an eNB transmits a downlink signal. In another example, CCA may be located at the end of each sub-frame, but there is no difference in an operation of transmitting a signal according to the result obtained by performing the CCA.

Figure 23:
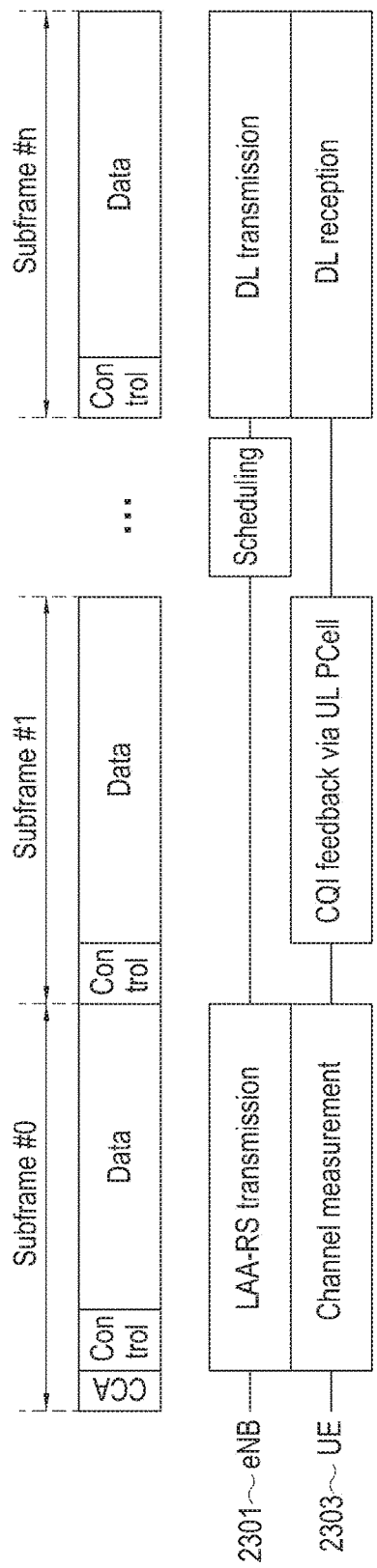
FIGS. 23, 24, 25, 26 and 27 illustrate various examples of an LAA DL operation of an FBE type in an unlicensed band according to various embodiments of the present disclosure.

FIG. 23 illustrates an example of an LAA DL operation of an FBE type in an unlicensed band according to an embodiment of the present disclosure.

Referring to FIG. 23, in a case of adding only an operation of performing CCA while maintaining the existing LTE standard, a configuration may be made as illustrated in FIG. 23. An eNB 2301 multiplexes and transmits an LAA-RS for a data transmission period after succeeding in CCA in sub-frame #0. Similar to an existing CRS, the LAA-RS may be a common reference signal to which all UEs within the eNB can listen, or similar to a DRS or a CSI-RS, the LAA-RS may be a reference signal for each UE to which only a particular UE can listen. Since the LAA-RS is a reference signal that the eNB 2301 sends after succeeding in the CCA, devices located within at least a predetermined distance from the eNB on average transmit no signal for the following data transmission period. UEs 2303 belonging to the eNB measure the LAA-RS and reports the same to a PCell for the next report period, for example, sub-frame #1. The PCell or S cell performs scheduling on the UEs, which have reported the channel quality, for sub-frame #3 and sub-frame #4 and transmits data for sub-frame #4. If the PCell and the SCell are not connected through a high-speed network, such as an optical cable, or the like, an additional delay time may occur.

Figure 24:
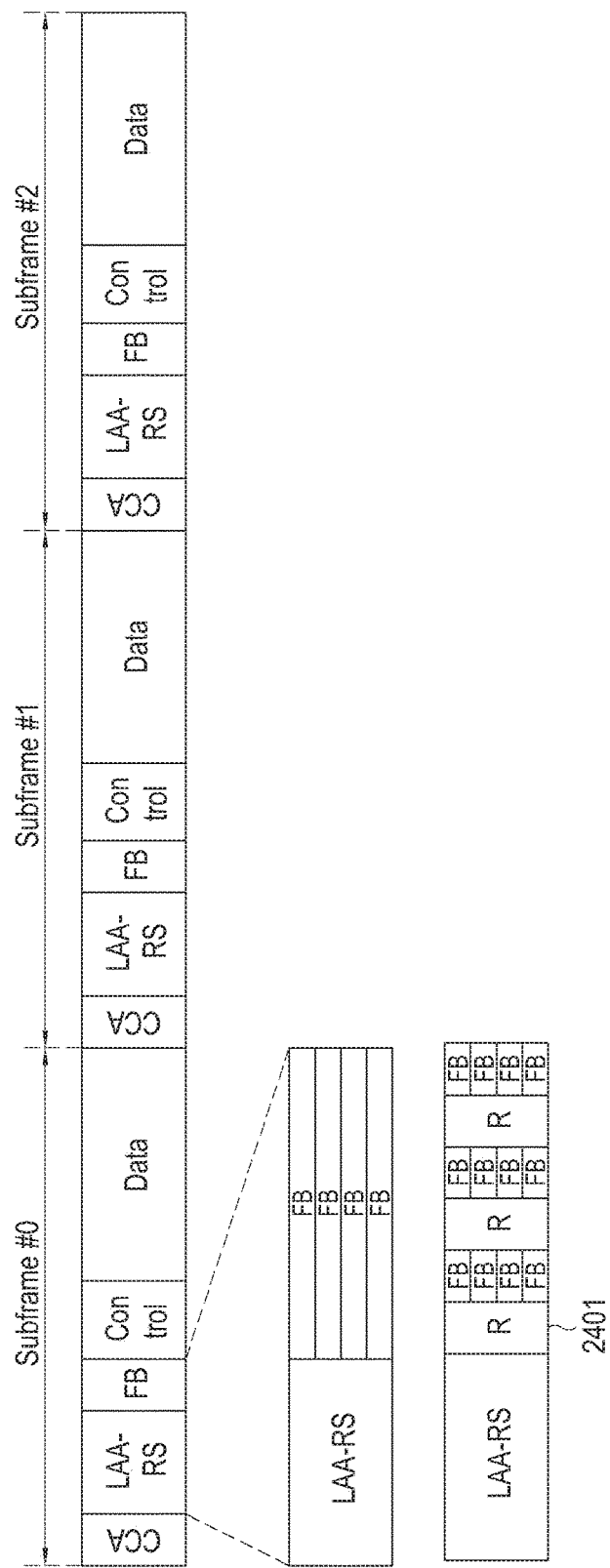

FIG. 24 illustrates an example of an LAA DL operation of an FBE type in an unlicensed band according to an embodiment of the present disclosure, where FIG. 24 depicts a case of performing a fast channel quality report to an SCell.

Referring to FIG. 24, in which an eNB changes the existing LTE standard and transmits an LAA-RS after succeeding in CCA and a UE immediately performs a channel quality report about this, a faster report is possible than in the example of FIG. 23. The eNB selects one encoding block suitable for the channel quality, among encoding blocks for MCS indices that have been prepared according to the channel quality report, and sends the same for the following data transmission period. In a case where the eNB has difficulty in preparing encoding blocks for MCS indices for one UE, the eNB may prepare encoding blocks of multiple UEs for one physical resource block (PRB) and may then perform overbooking-based scheduling to prevent the encoding blocks from being allocated to a UE that has lower channel quality than expected. The configuration of a feedback (FB) period for the channel quality report may support multiple UEs in various manners, such as frequency-division multiple access (FDMA), orthogonal frequency-division multiple access (OFDMA), time-division multiple access (TDMA), and TDMA-OFDMA, according to systems. In the case of OFDMA, feedback signals of each UE are distinguished in units of transmission for each frequency, and LBT may have to be performed according to regulation before the feedback signals are transmitted. To this end, a method of adding a CCA period for a UE between LAA-RS and FB, or a method in which a UE performs CCA for an LAA-RS period and an LAA-RS signal is excluded from the CCA measurement may be used. The UE may perform the CCA for a frequency subcarrier that is the same as an FB resource or for all bands. In a case where the FB resource physically hops, the CCA has to be performed at one time for all hopping frequency subcarriers. If FB periods are so long that another system that is the same as Wi-Fi can provide an opportunity to perform CCA and transmission, the eNB may transmit a reservation signal (R) 2401 between the FB periods.

Figure 25:
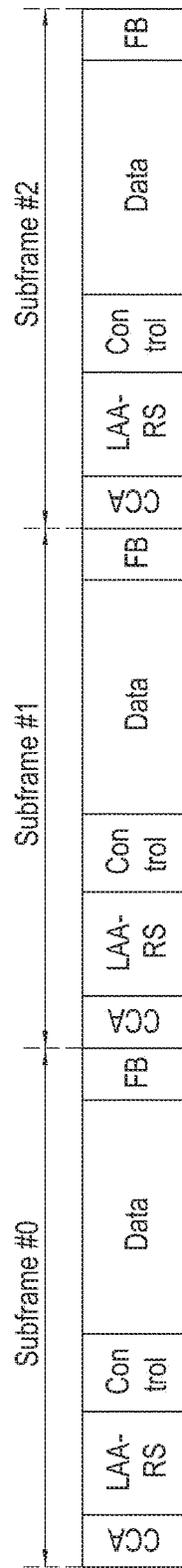

FIG. 25 illustrates an example of an LAA DL operation of an FBE type in an unlicensed band according to an embodiment of the present disclosure, where FIG. 25 depicts another example of performing a fast channel quality report to an SCell.

Referring to FIG. 25, the method is similar to the method of the fast channel quality report illustrated in FIG. 24. However, since a feedback period immediately follows LAA-RS measurement in the case of a low-performance UE, a feedback period 2501 is located at the end of a sub-frame in the method of FIG. 25 in consideration of a situation in which the UE cannot report. Accordingly, resource allocation is possible in the sub-frame that follows the sub-frame measured/reported by the UE. According to a system, the UE may be controlled by a command of an eNB to perform a report in n+k FB resource for sub-frame n having received a control channel. In this case, k may be configured in an RRC Connection Setup or RRC Connection Reconfiguration process that is an upper layer message, may be configured by downlink control information (DCI) within a physical layer control channel, may be configured by a random access response (RAR) message during an arbitrary access (RACH) procedure, or may be configured by the ID or location of a physical layer reference signal.

The value k may be set to one value or in the range of a value. In a case where the k value is set in a range, UEs have to share and transmit FB resources within k=[a, a+b]. Accordingly, a physical layer has to support a multiple access method, such as FDMA, CDMA, TDMA, etc., or LBT. Other examples of setting k in a range may include the number of continuous common uplink sub-frames of a frame that the eNB may indicate as a common message or the number of continuous uplink sub-frames allocated as individual messages to UEs by the eNB. Alternatively, k may be one value, and a UE may receive a setup of a timer for time limit during which transmission of FB resources may be delayed. The eNB may set k or the value of the timer to a common control channel or an individual control channel for each UE through a broadcast control channel (BCH) or common DCI. k may be determined based on the absolute time of a PCell or may be determined based on the determination that only a sub-frame when an SCell secures resources is a valid sub-frame, considering an operation in which the eNB non-consecutively secures resources in the SCell. The valid sub-frame may determine validity in a case where the eNB or UE secures resources (DL & UL), in a case where only the eNB secures resources (DL), or in a case where only the UE secures resources (UL).

According to the frame structure of an unlicensed band, since DL and UL may be dynamically changed and securing resources is determined according to whether LBT succeeds or not, an operation for determining the valid sub-frame is required. For example, the valid sub-frame may be determined on condition of at least one of the followings: 1) a downlink reference signal in the SCell of the eNB is received by the UE in the specified sub-frame n+k; 2) the UE succeeds in CCA prior to FB in the specified sub-frame n+k;

3) the eNB sends information on continuous downlink occupancy including the previous sub-frame and the current sub-frame, and the UE receives the same in the specified sub-frame n+k; and 4) the eNB sends information on continuous uplink occupancy including the previous sub-frame and the current sub-frame, and the UE receives the same in the specified sub-frame n+k. If it is determined that the sub-frame n+k is not a valid sub-frame, the UE performs a report in the first determined valid sub-frame that is controlled such that FB resources are allocated in a sub-frame larger than the sub-frame n+k. If a CCA result for LBT fails before the UE attempts a report in the sub-frame k, the attempt is performed again in the next possible report resource before the expiration of the timer or before a set time.

Additionally, 1) if the retry fails in the valid sub-frame up to a particular time point or 2) if the valid sub-frame for report is not identified in advance until the expiration of a timer or until the time point designated by the eNB for the UE, the UE selects one of candidate SCells configured in advance by the eNB according to at least one of the following methods: 1) a method of selecting arbitrary one SCell; 2) a method of selecting the highest priority SCell according to a certain criterion; 3) a method of selecting one SCell having the fastest report resource within a particular window; and 4) a method of selecting one SCell designated as L1 indication by the eNB, and the UE reports with at least one of 1) a resource allocated by performing RACH (arbitrary access), 2) a resource configured to the candidate SCell by the eNB, and 3) a resource identified not to be used after LBT is performed although a resource is not allocated.

Figure 26:
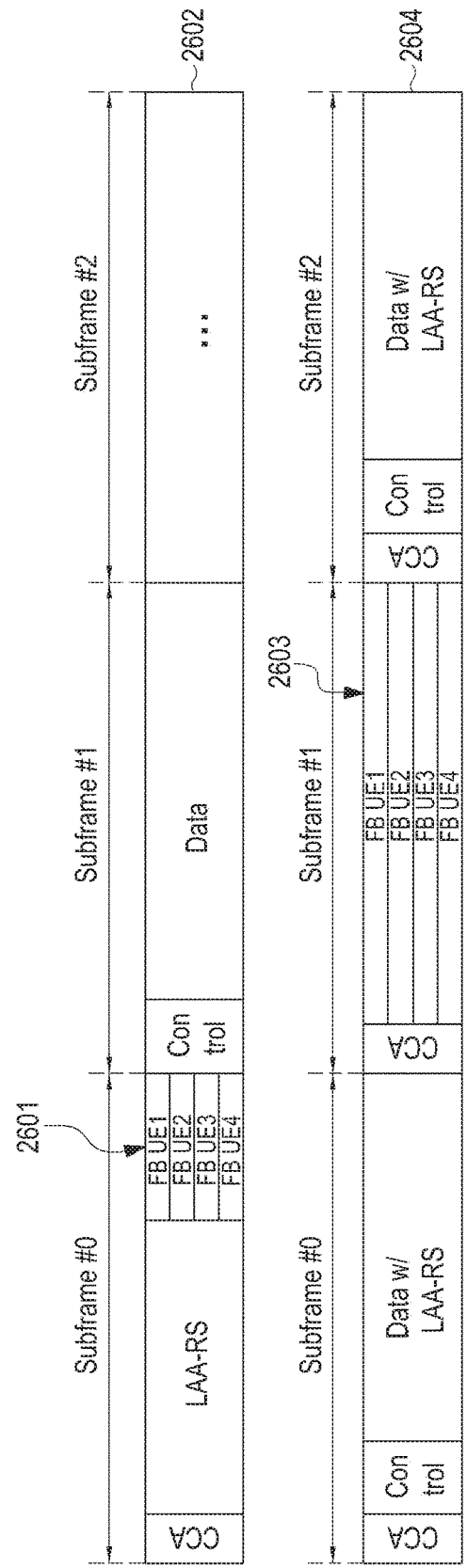

FIG. 26 illustrates an example of an LAA DL operation of an FBE type in an unlicensed band according to an embodiment of the present disclosure, where FIG. 26 depicts yet another example of performing a fast channel quality report to an SCell.

Referring to FIG. 26, the method is similar to that of FIG. 25. However, in a case where it is difficult to divide one sub-frame into several periods for different uses, an eNB may operate according to a structure in which an LAA-RS and a feedback period 2601 are in one sub-frame as illustrated in 2602, or a structure in which the eNB transmits an LAA-RS within a data period in the preceding sub-frame of two sub-frames abutting each other and receives feedback 2603 in the following sub-frame as illustrated in 2604. In the sub-frame performing only FB, the UE may perform CCA for a frequency subcarrier that is the same as an FB resource or for all bands. In a case where an FB resource physically hops, the CCA has to be performed at one time for all hopping frequency subcarriers.

Figure 27:
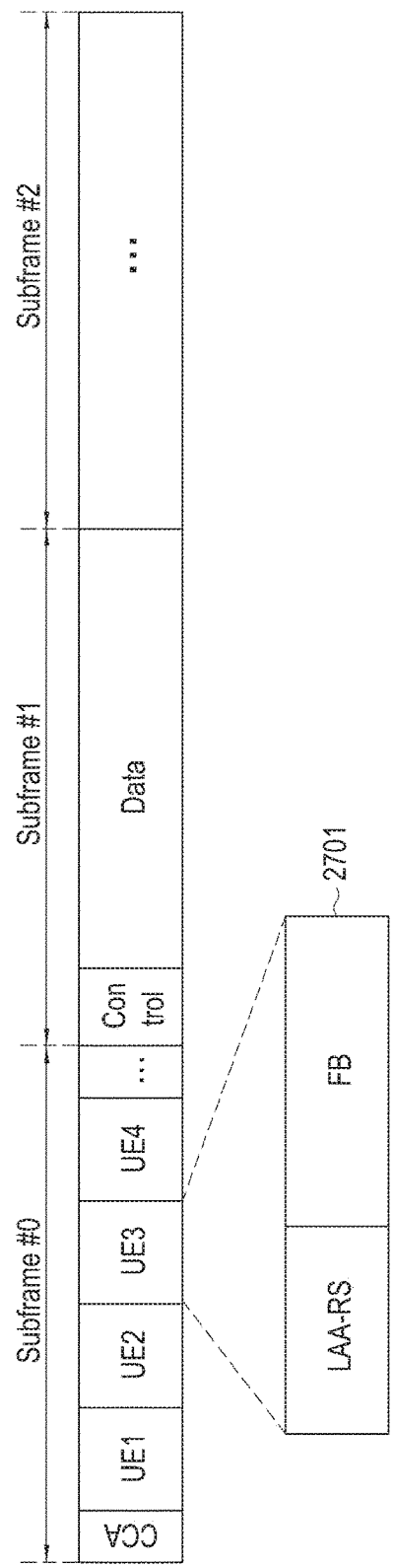

FIG. 27 illustrates an example of an LAA DL operation of an FBE type in an unlicensed band according to an embodiment of the present disclosure, where FIG. 27 depicts yet another example of performing a fast channel quality report to an SCell.

Referring to FIG. 27, the method is similar to that of FIG. 26, but may be applied to a TDMA or Beamforming system in such a manner of allocating a reference signal and a feedback resource 2701 to a TDM for several UEs.

Figure 28A:
FIGS. 28A, 28B, 29, 30 and 31 illustrate various examples of an LAA DL operation of an LBE type in an unlicensed band according to various embodiments of the present disclosure.

FIG. 28A illustrates an example of an LAA DL operation of an LBE type in an unlicensed band according to an embodiment of the present disclosure.

Referring to FIG. 28A, an eNB 2801 performs ECCA at the start of a particular sub-frame in a downlink of an LBE type, and if the ECCA succeeds, the eNB 2801 transmits a downlink signal. In a case of adding only an operation of performing ECCA while maintaining the existing LTE standard, a configuration may be made as illustrated in FIG. 28A. The eNB 2801 transmits an LAA-RS 2803 for a reservation period after succeeding in the ECCA in sub-frame #0. Similar to an existing CRS, the LAA-RS 2803 may be a common reference signal to which all UEs within the eNB can listen, or similar to a DRS or a CSI-RS, the LAA-RS may be a reference signal for each UE to which only a particular UE can listen. Since the LAA-RS is a reference signal that the eNB sends after succeeding in the ECCA, devices located within at least a predetermined distance from the eNB on average transmit no signal for the following data transmission period after failing in CCA. UEs belonging to the eNB measure an LAA-RS and report the same to a PCell in the following sub-frame#1. The PCell or Scell performs scheduling on the UEs, which have reported the channel quality, for sub-frame #3 and sub-frame #4 and transmits data for sub-frame #4. If the PCell and the SCell are not connected through a high-speed network, such as an optical cable, or the like, an additional delay time may occur.

Figure 28B:
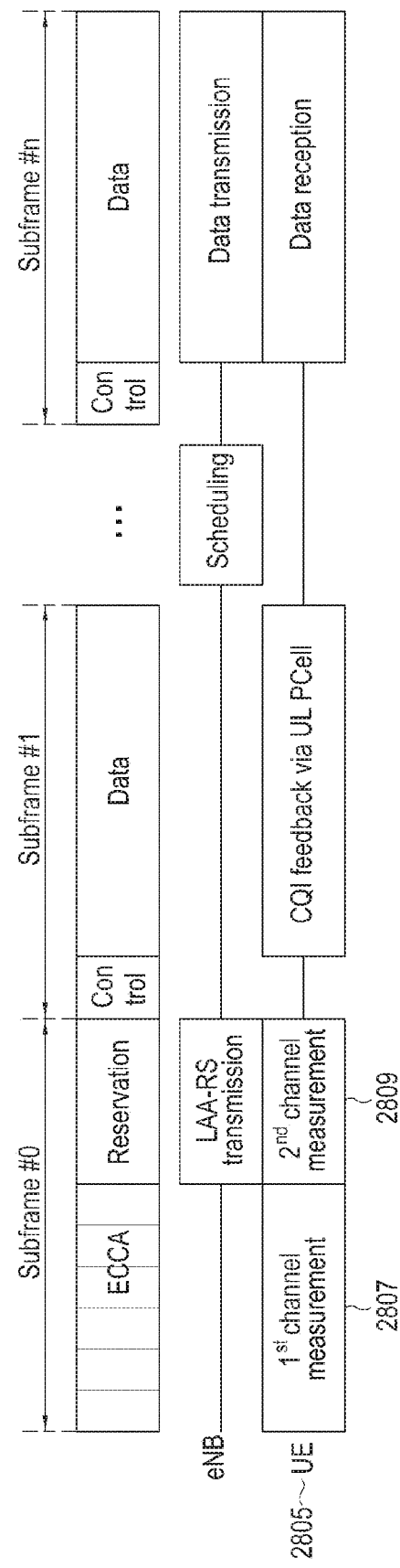

FIG. 28B illustrates an example of an LAA DL operation of an LBE type in an unlicensed band according to an embodiment of the present invention.

Referring to FIG. 28B, the method is substantially the same as that of FIG. 28A in the basic operation, and performance enhancement may be expected by merely changing a channel measurement method of a receiver of a UE 2805.

In FIG. 28B, since the UE 2805 can distinguish between LAA-RS signals in a reservation period, the UE 2805 distinguishes the channel measurement value of a period 2809 for which an LAA-RA is received, among the whole sub-frame, and the channel measurement value of a period 2807 prior to the period 2809 and stores the same. The UE 2805 may report two channel measurement values to the eNB, or may correct and report the channel measurement value for the existing LAA-RS. Although this method may also be applied to the FBE method of FIG. 23 by additionally performing channel measurement for a CCA period, it may be difficult to accurately perform the channel measurement since the CCA period is as short as 9 ms to 20 ms. Further, channel measurement is possible in the FBE method only when data is allocated, whereas channel measurement is possible using a reservation signal in the LBE method.

Basically, various modifications for the remaining period other than CCA in the LBE method may be used in the same way after ECCA and Reservation periods in the FBE method. The present disclosure omits this combination and is focused on a modification using the Reservation period in the FBE.

Figure 29:
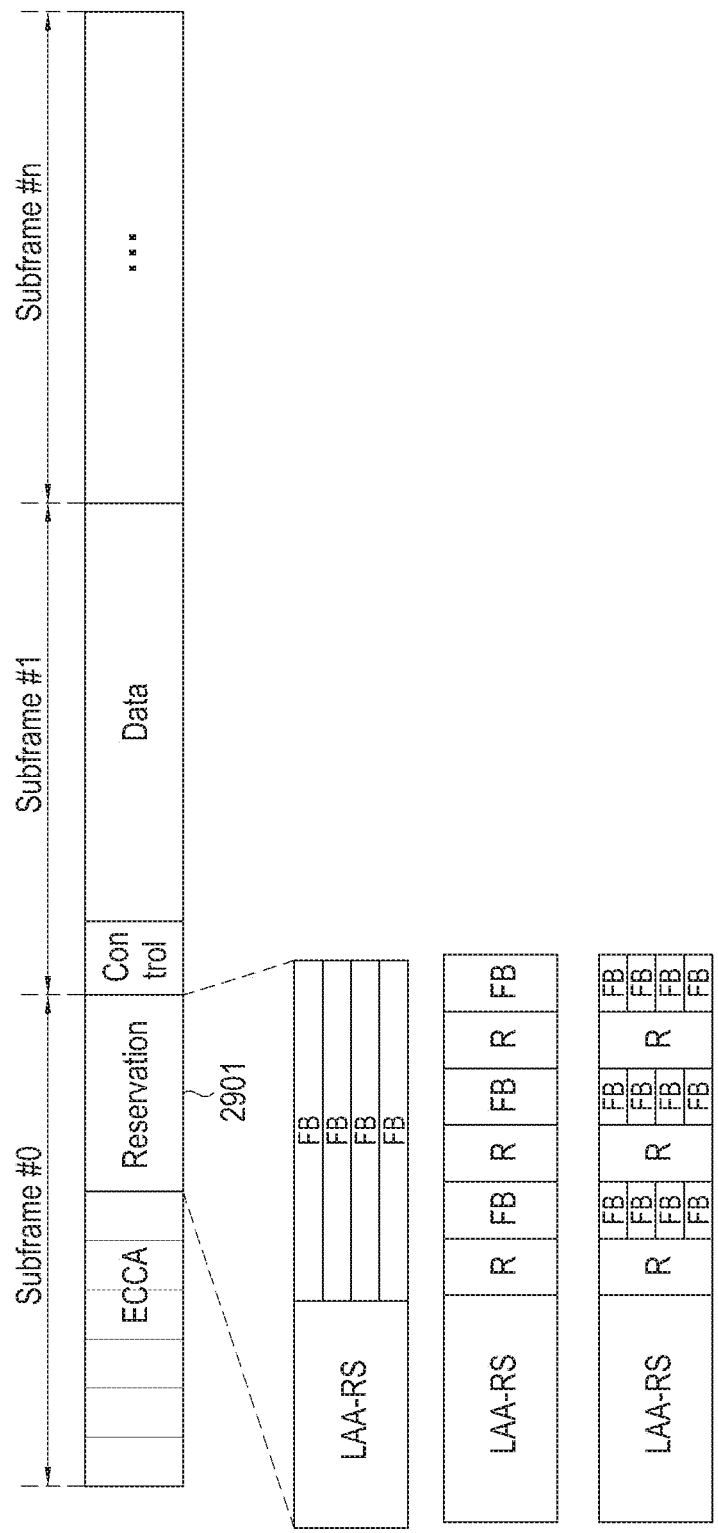

FIG. 29 illustrates an example of an LAA DL operation of an LBE type in an unlicensed band according to an embodiment of the present disclosure, where FIG. 29 depicts an example of performing a fast channel quality report to an SCell.

Referring to FIG. 29, a period for sending an LAA reference signal and a feedback signal for a channel quality report is configured in a Reservation period 2901. Also, a suitable structure may be used according to a multiplexing method, such as TDMA, FDMA, OFDMA, TDMA-OFDMA, etc. The LBE method has a technical issue that the structure of the Reservation period 2901 also has to be variable since a time point to occupy a channel in ECCA is variable.

Figure 30:
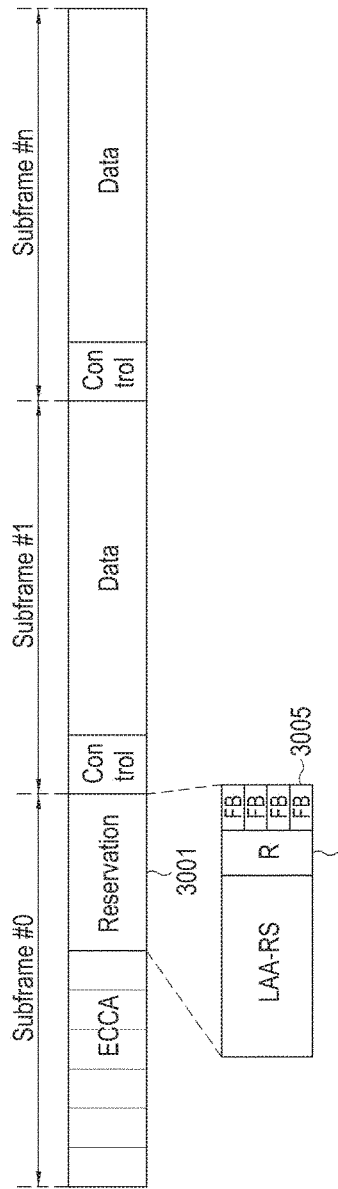

FIG. 30 illustrates an example of an LAA DL operation of an LBE type in an unlicensed band according to an embodiment of the present disclosure, where FIG. 30 depicts another example of performing a fast channel quality report to an SCell.

Referring to FIG. 30, when a residual reservation period 3001 is minimal, a reservation signal 3003 and a feedback channel 3005 are configured in the shortest period other than the period for an LAA-RS, as opposed to the embodiment of FIG. 29.

Figure 31:
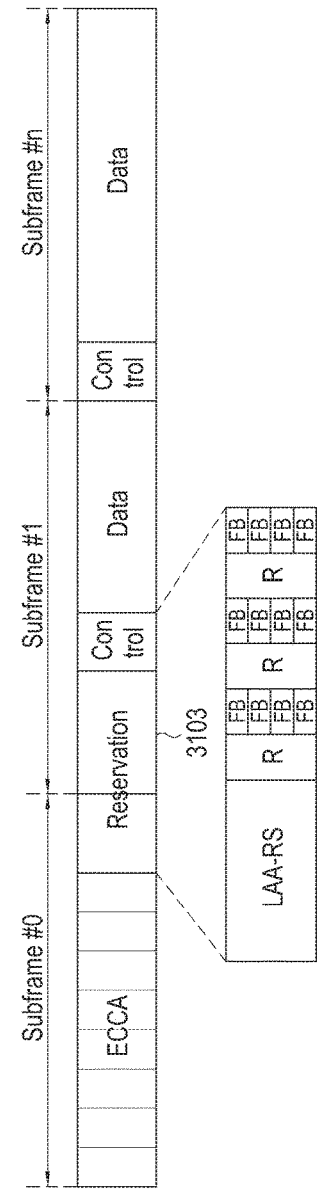

FIG. 31 illustrates an example of an LAA DL operation of an LBE type in an unlicensed band according to an embodiment of the present disclosure, where FIG. 31 depicts yet another example of performing a fast channel quality report to an SCell.

Referring to FIG. 31, if it is difficult to configure a short Reservation period as in the embodiment of FIG. 30, a Reservation period 3103 has to be designed to have a fixed length, but to enter or overlap the next sub-frame if a time point to occupy a channel in ECCA is late. However, this method is not preferred since this method breaks down the reference for a sub-frame boundary of a system.

[B. Link Adaptation Method Based on Channel Quality Report Measured at the Time of Data Transmission after Resource Allocation]

In regard to the link adaptation technique A, specifically, "Link adaptation method based on channel quality report measured prior to resource allocation and data transmission," which has been described above, the technique is aimed at making an application by minimizing a delay in a channel quality value when a channel is occupied using CCA or ECCA since a periodic channel measurement value for scheduling of the existing LTE is inaccurate. However, the burden of configuring an LAA reference signal and a feedback channel in one sub-frame and remaking an existing control and data channel structure to achieve this exists. Accordingly, method B applies a channel quality value at the time of data transmission to scheduling while reusing the existing control and data channel structure.

Figure 32:
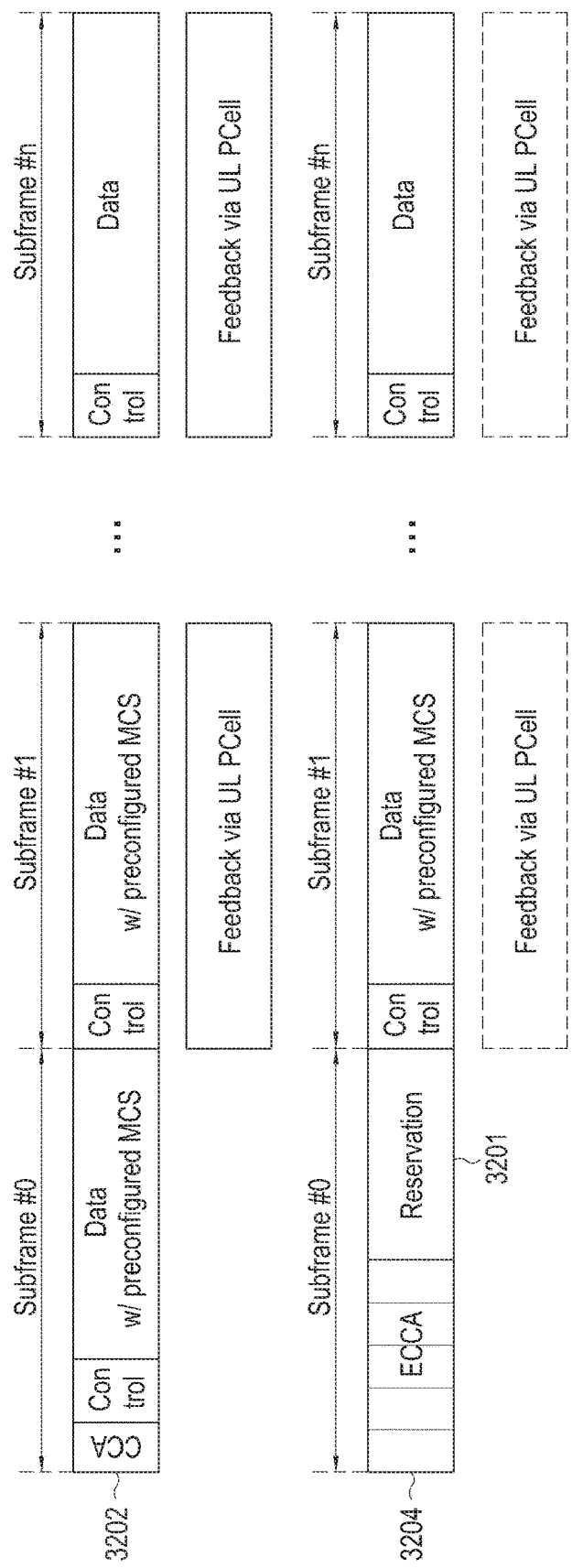
FIGS. 32 and 33 illustrate examples of a simplified FBE scheme and a simplified LBE scheme according to various embodiments of the present disclosure.

FIG. 32 illustrates an example of a simplified FBE scheme and an example of a simplified LBE scheme according to an embodiment of the present disclosure.

Referring to FIG. 32, 3202 illustrates the FBE method, and 3204 illustrates the LBE method. FIG. 32 represents a method of performing channel measurement using only a reference signal, which is multiplexed with data at the time of transmitting the data and then transmitted, when performing a downlink operation in each method. Since a channel measurement report is not received in advance from a UE, transmission is performed according to a preconfigured MCS index from first sub-frame #0 to sub-frame #3. Since the preconfigured MCS index conservatively configures an index robust to an error, the preconfigured MCS index causes a reduction in system performance. According to another embodiment, the last reported MCS index for each UE may be used instead of the preconfigured MCS index. Alternatively, while a UE does not receive data in the previous radio frame, an eNB may control the UE to perform channel measurement on a data transmission period of another UE. The eNB may perform scheduling in the current radio frame based on a channel quality report of the UE controlled in the previous radio frame. For the reliability of a channel quality report for each radio frame, the eNB basically has to uniformly maintain transmission power of a reference signal for each radio frame. The eNB may control each UE, each UE group, all connected UEs within the eNB, or all UEs within the eNB using a separate control signal to measure channel quality for a reference signal of the eNB in the data period transmitted to the other UE. When a resource for each sub-frame report is allocated through a PCell, in the case of the FBE method, the channel quality may be immediately reported in sub-frame #1, and in the case of the LBE method, the channel quality may be reported in sub-frame #1 only when channel measurement for reservation 3201 is performed.

According to the embodiment of FIG. 32, when an FB resource for report is configured with a long period in the PCell, or when an FB resource is aperiodically configured, there is a problem of scheduling delay that happens in common when channel quality is reported through the existing PCell. Accordingly, channel quality may be reported through an SCell as in FIG. 33.

Figure 33:
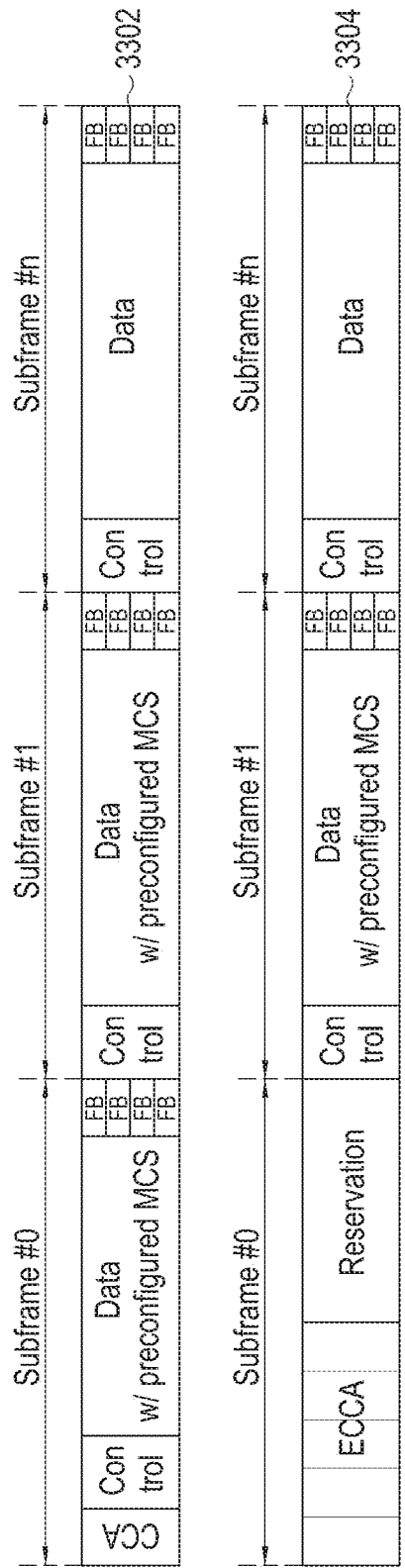

FIG. 33 illustrates another example of a simplified FBE scheme and another example of a simplified LBE scheme according to an embodiment of the present disclosure, where FIG. 33 illustrates a case of performing a fast channel quality report through an SCell.

Referring to FIG. 33, 3302 illustrates the FBE method, and 3304 illustrates the LBE method.

In the FBE method of 3302, an SRS period of a UE in the existing LTE standard may be used again, and the structure of the SRS period may be multiplexed with a frequency or a code. Since it may be difficult to send all existing MCS index information for the SRS period, the UE may transmit a MCS readjustment signal based on a channel measurement result in the corresponding sub-frame. For example, the UE may send 2 bit information of +1 and −1, or 2 bit information of +1, +2, −1, and −2. The actual MCS index may be multiplied by delta (Δ) through the readjustment. For example, when the UE sends +1, the actual MCS index requested to be changed is +Δ, and when the UE sends −2, the actual MCS index requested to be changed is −2×Δ. An eNB may inform the Δ value with a common control message, such as a broadcast control signal, a system information block (SIB), a Common DCI, or the like. The eNB may configure, in advance, an SRS application for a particular sub-frame in order to distinguish an SRS resource used for an existing SRS and an SRS resource used for FB, such channel report, ACK/NACK, or the like. The SRS application indicator may be configured to be a common control message (such as a broadcast control signal, SIB, Common DCI, etc.), a separate control message (such as Dedicated DCI, etc.), or an RRC Connection Setup/Reconfiguration message that is an upper layer message.

The same method may be applied to PUSCH or PRACH. When the method is applied to the PUSCH, information on at least one of ACK/NACK and CQI may be sent in a particular position of a PUSCH resource. When the method is applied to the PRACH, 1) a report may be made by distinguishing ACK/NACK using group information of a preamble ID allocated to a UE, or 2) a UE may be distinguished by temporary mobile subscriber identity (TMSI) that is included when PUCH of the UE for a RAR is transmitted, and a report may be made using at least one piece of information of ACK/NACK and CQI that are transmitted together. For example, if the eNB configures a particular sub-frame for the purpose of report, and two or more of SRS, PUCCH, PUSCH, and PRACH are included in the sub-frame, the UE may report using at least one of a channel that is determined according to configured priorities between the SRS, the PUCCH, the PUSCH, and the PRACH and a channel that can most rapidly perform transmission according to transmissibility conditions of the SRS, the PUCCH, the PUSCH, and the PRACH.

[C. Link Adaptation Method Based on Channel Quality Report Measured Between Resource Allocation and Data Transmission]

Again in regard to the link adaptation technique A, specifically, "Link adaptation method based on channel quality report measured prior to resource allocation and data transmission," which has been described above, the technique is aimed at making an application by minimizing a delay in a channel quality value when a channel is occupied using CCA or ECCA since a periodic channel measurement value for scheduling of the existing LTE is inaccurate. However, the burden of configuring an LAA reference signal and a feedback channel in one sub-frame and remaking an existing control and data channel structure to achieve this exists. Further, "B. Link adaptation method based on channel quality report measured at the time of data transmission after resource allocation" is simple, but has difficulty in rapidly adapting to a change of a channel. Accordingly, method C is aimed at applying a channel quality value at the time of occupying a channel to scheduling as a minimal delay while using an existing control and data channel structure again.

Figure 34:
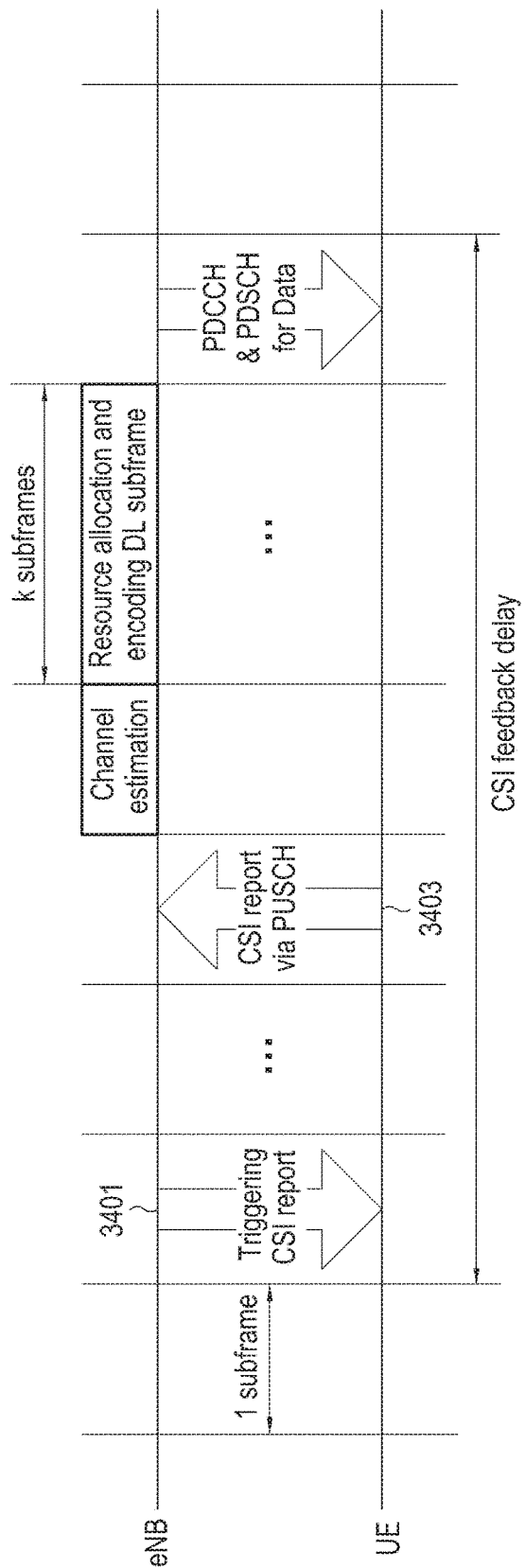
FIG. 34 illustrates a downlink scheduling operation of an existing LTE standard based on an aperiodic report according to an embodiment of the present disclosure.

FIG. 34 illustrates a downlink scheduling operation of an existing LTE standard based on an aperiodic report.

Referring to FIG. 34, in regard to the aperiodic report as opposed to a periodic report, a UE performs channel measurement according to an instruction 3401 of an eNB and raises a channel quality report 3403 in an uplink resource allocated by the eNB. However, if the eNB wants to aperiodically instruct the UE to perform a channel quality report after LBT succeeds, a delay occurs in order to allocate an uplink resource to the UE using a channel measurement result for the uplink resource. Further, if the UE performs the channel quality report for a signal of the eNB to an SCell rather than a PCell, a delay due to LBT may additionally occur.

Accordingly, in the third method, reducing a delay by allocating a periodic resource (semi-persistent) for a channel quality report to an uplink is considered. In this case, there is a problem in that the amount of required resources may be greater than available uplink resources if periodic resources are allocated to all UEs. Accordingly, the eNB may allocate the same resources to report to a plurality of UE groups. The resources may be allocation resources for one or more sub-frames. The eNB may send a control signal to only one UE, among a plurality of UE groups for one resource to report, based on the previous scheduling result and system performance. The control signal may be an existing downlink control channel (PDCCH) or a separate indication signal. Since the control signal is scrambled using unique C-RNTI or M-RNTI for each UE, the corresponding UE may identify indication of the eNB. The UE having received an instruction measures an LAA-RS in the designated sub-frame and performs a channel quality report in the closest available periodic sub-frame that has been allocated in advance. In this method, an uplink signal of the UE has to be transmitted so as to be robust to a channel error since the eNB has difficulty in determining the channel quality of an uplink resource in advance. The measurement and report operations may be separately instructed. In an additional example, a UE having received a downlink control channel or an indication signal of the eNB performs a channel quality report in the same sub-frame in which an uplink sub-frame is configured or in the closest available periodic uplink sub-frame when a PCell gives information. Alternatively, the UE performs a channel quality report in the closest available periodic uplink sub-frame when an SCell gives information.

In this case, the channel quality measurement may be determined based on at least one of a measurement result for the latest N valid downlink sub-frames, a measurement result for a downlink sub-frame for a period of time corresponding to the number of latest N sub-frames, a measurement result for a downlink sub-frame for the latest N ms (absolute time), and a measurement result within the latest average window having a magnitude of N. The channel quality report may include information on a time point measured together with a channel quality value, and the information may be determined based on at least one of a system frame number (SFN), a sub-frame index, the relative number of times for a channel occupancy time (COT) interval (that is, the location of an COT interval during which measurement is performed), and the index of a measurement opportunity configured by the eNB. The measurement time information is useful for accurately analyzing a channel at a particular time point and predicting quality based on a channel quality report from a UE in consideration of a measurement value change when the eNB dynamically controls a transmission variable, such as transmission power. "Available" in the wording "the closest available uplink sub-frame" means a sub-frame that satisfies the result of an AND/OR logical expression for one or more of a sub-frame configured by an eNB to perform a channel quality report, a sub-frame that has succeeded in uplink LBT, a sub-frame secured and notified to a UE by an eNB, and an uplink sub-frame separately allocated by an eNB.

Figure 35:
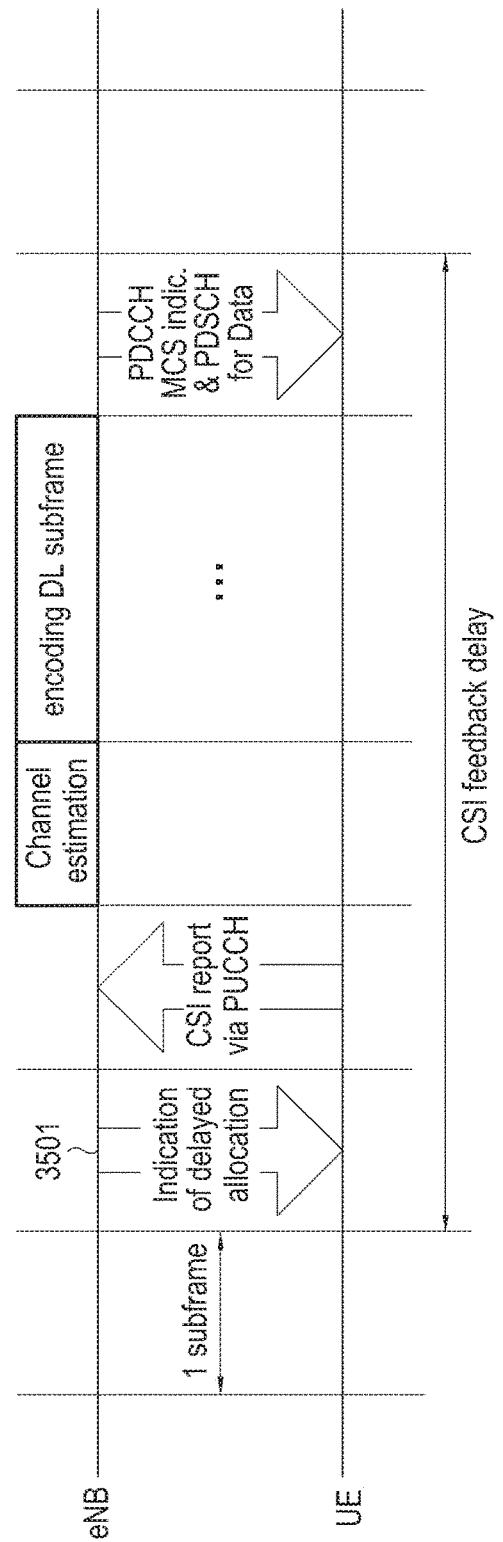
FIGS. 35, 36, 37 and 38 illustrate various examples of a downlink scheduling operation based on delayed allocation according to various embodiments of the present disclosure.

In a case of applying the channel quality using a periodic resource for each UE group, which has been described above, since the location of a channel quality report is predicted in advance, an eNB may provide an instruction relating to delayed allocation to a UE just before a periodic uplink sub-frame for a channel quality report, as illustrated in FIG. 35. For example, the eNB informs, in advance, the corresponding UE that the eNB will perform data transmission after four sub-frames. The eNB having received the channel quality report of the UE sends, to a control channel (PDCCH), an MCS index determined based on a channel quality value in the previously notified sub-frame after a delay time for scheduling and transmits a data block encoded using a data channel (PDSCH) to the UE. This method is advantageous in that a load caused by a report can be reduced since the eNB just needs to report channel quality for a pre-designated resource. For example, the eNB may instruct a certain UE to perform a channel quality report on PRB #0 to PRB #4 among a total of 50 PRBs. The UE measures and reports channel quality for a resource that has been instructed by the eNB.

FIG. 35 illustrates a downlink scheduling operation based on delayed allocation according to an embodiment of the present disclosure.

Referring to FIG. 35, since a new control signal 3501 to inform of delayed allocation is required, an existing downlink control channel (PDCCH) may be slightly modified to perform the same operation. Namely, for some UES, an eNB may inform the PDDCCH that data will be allocated after n sub-frames. A temporary MCS index notified by the PDCCH is changed and informed when transmission is actually performed after n sub-frames. The changed MCS index may be notified to the PDCCH again or may be notified to a separate signal.

Figure 36:
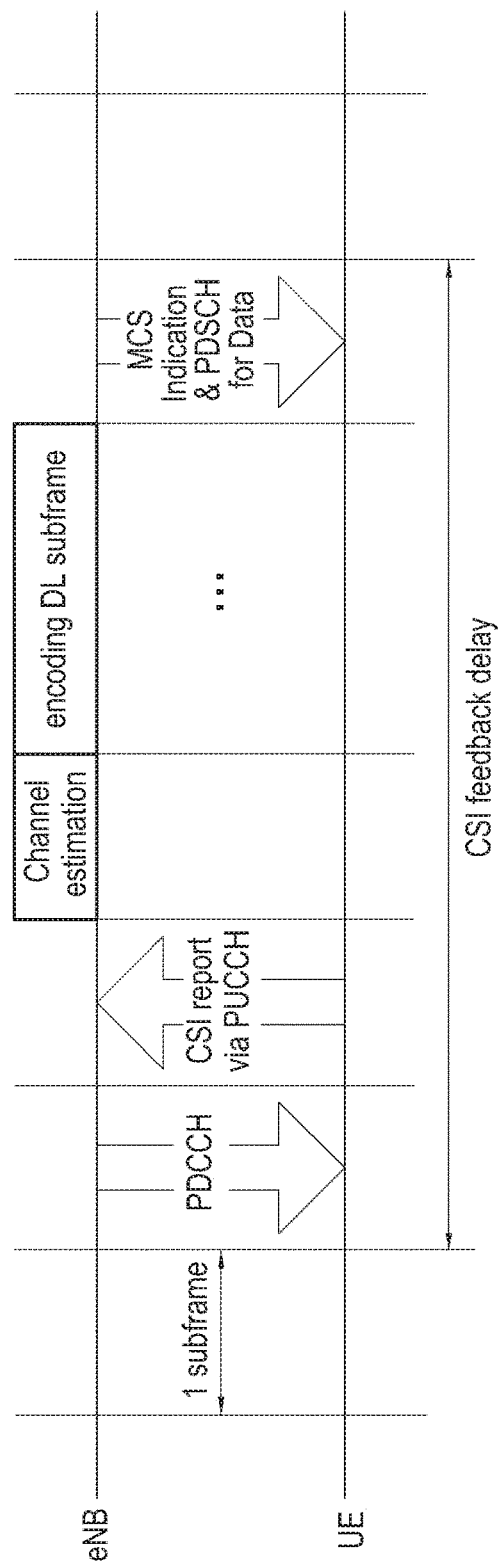

FIG. 36 illustrates another example of a downlink scheduling operation based on delayed allocation according to an embodiment of the present disclosure.

Referring to FIGS. 35 and 36, the method of FIG. 36 and the method of FIG. 35 may cause a problem when there is a difference between channel quality measured at first and actual channel quality reported by a UE. In particular, an error may further occur when the actual channel quality reported by the UE is lower than the channel quality measured at first. Accordingly, an eNB may send a signal for withdrawing predetermined transmission at the time point of sending data.

Figure 37:
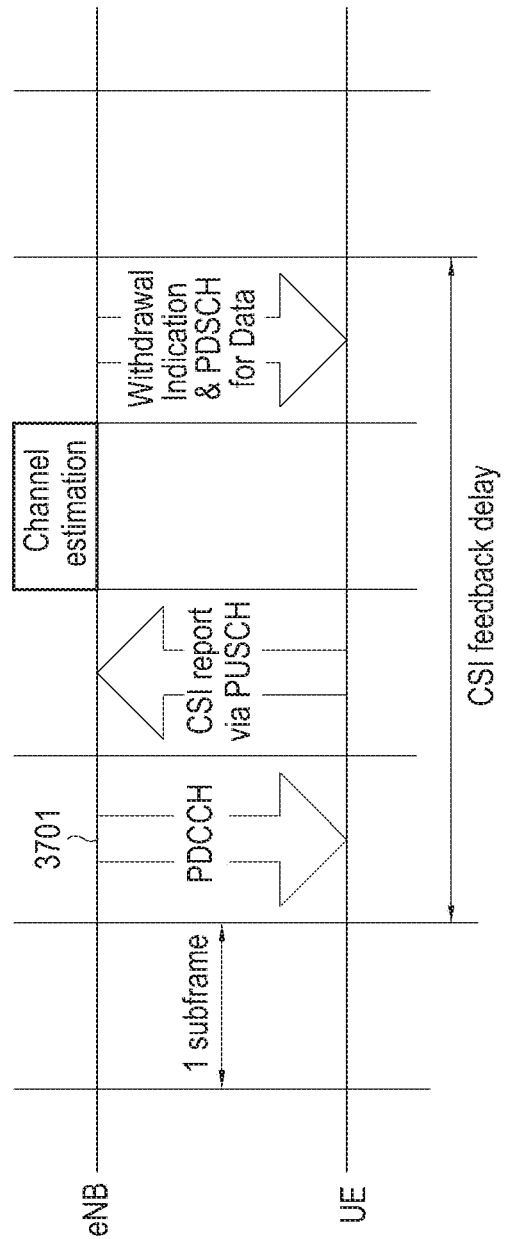
Figure 38:
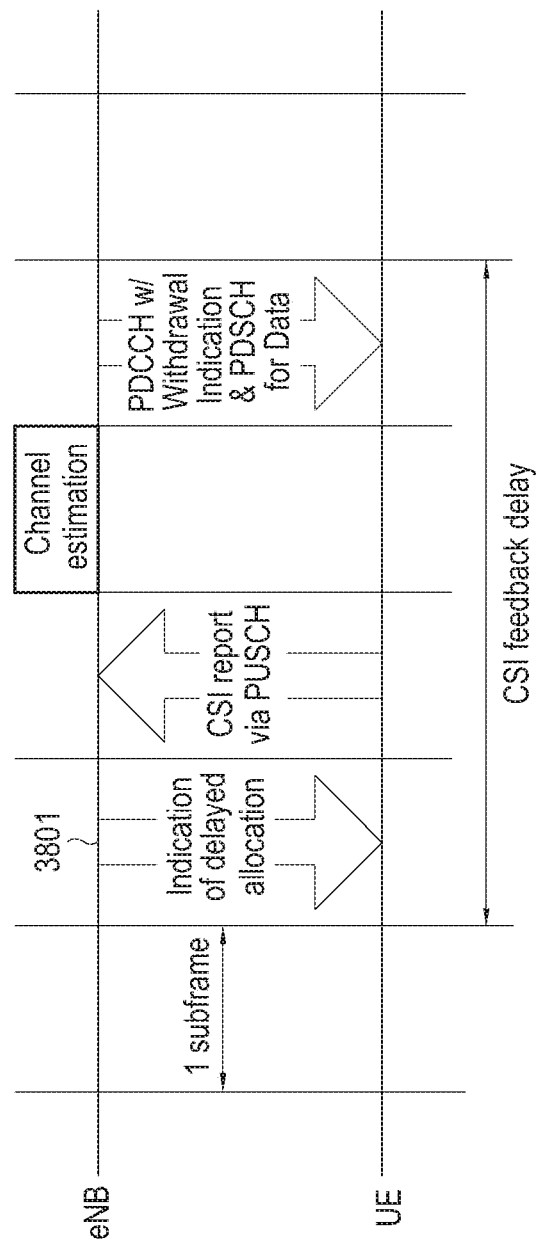

FIGS. 37 and 38 illustrate other examples of a downlink scheduling operation based on delayed allocation according to various embodiments of the present disclosure.

Referring to FIGS. 37 and 38, operations illustrate withdrawing predetermined transmission in a case where an eNB informs a PDCCH 3701 or a delayed allocation indication signal 3801 of delayed allocation. The withdrawal signal may be included in the existing PDCCH, or may be configured to be a separate signal. If a UE receives the withdrawal signal, the UE abandons reception of data for a reserved resource. A Pending signal for performing withdrawal+reallocation may be considered as a modification of the withdrawal signal. This corresponds to a case of sending information on withdrawal indication and delayed allocation indication together, which have been illustrated in the embodiment of the present disclosure.

PUCCH used to represent a periodic uplink resource in the embodiment of the present disclosure is actually a periodically allocated PUSCH resource, or may also be expressed as PUSCH in a case where a UE makes a report to the PUSCH when an aperiodically allocated PUSCH resource and a periodic PUCCH resource are in the same sub-frame.

In a case where an S Cell fails in a channel quality report due to a failure in LBT, the UE identifies whether an additional uplink resource has been allocated within a predetermined period of time, and if it is identified that the resource has been allocated, the UE performs a channel quality report in the closest uplink resource. If not, 1) the UE immediately makes a report to a periodic uplink resource allocated to a PCell, or 2) the UE stands by while monitoring a control channel of the PCell within a predetermined period of time to identify whether an aperiodic uplink resource is allocated if it is determined that a periodic uplink resource has not been allocated to the PCell. Alternatively, if an uplink resource is not allocated to the PCell or SCell within a predetermined period of time, 3) the UE requests an uplink resource through an RACH procedure and performs a channel quality report to the allocated resource.

In a case where the UE performs a channel quality report for the SCell to another carrier, that is, the PCell, what carrier (shared band channel) the channel quality value is for has to be informed. Since the relationship between a PCell and an SCell has been configured in advance in general cross carrier scheduling, separate information is not required. However, since the UE may make a report to the PCell when the UE cannot make a report to the Scell due to a failure in LBT in the present disclosure, separate information is required. Accordingly, the UE may send uplink control information containing an existing carrier indicator field (CIF), or may send an upper layer signal having the same information. This method may also be identically applied to a different type of report, for example, an ACK/NACK report, a reception power report, or an interference report, as well as a channel quality report.

If a method that does not use explicit CIF information is required, an eNB may instruct a UE to perform a report for a particular SCell to a downlink control channel on the basis of a failure and delay in a report in the SCell. In this case, a report time and the location of a report resource may be additionally configured in this instruction. Based on a report in the configured resource, the eNB may distinguish reports for a particular SCell without separate CIF information.

[D. Method of Reporting Channel Quality and ACK/NACK Together or Separately]

When a UE performs a channel quality report according to a procedure for the channel quality report in the present disclosure, the channel quality report and an ACK/NACK report may be coupled with each other according to a configuration of a report mode. The ACK/NACK report is generally configured to be sent in an uplink sub-frame (for example, (n+k)-th sub-frame) determined in advance on the basis of n-th sub-frame to which downlink data has been allocated. So, the UE has been configured to perform the channel quality report and the ACK/NACK report together through one report resource if the (n+k)-th uplink sub-frame is the same as a periodic or aperiodic uplink sub-frame configured to report channel quality. However, the number of DL/UL sub-frames is variable in the DL & UL TDD frame structure in an unlicensed shared band handled in the present disclosure. Accordingly, since it is impossible to ensure that an uplink sub-frame having a fixed interval for a downlink allocation resource exists, a resource for the ACK/NACK report may be determined according to at least one of the following methods.

1) The closest uplink resource sends the ACK/NACK report in a sub-frame that is equal to or larger than a sub-frame ((n+k)-th) determined for a DL sub-frame (n-th). In this case, there is a condition that an uplink resource (PUCCH or PUSCH) separately allocated for preventing collision has to be ensured.

2) The closest periodic uplink channel quality report resource sends the ACK/NACK report in a sub-frame that is equal to or larger than a sub-frame ((n+k)-th) determined for a DL sub-frame (n-th).

3) If the closest uplink channel quality report resource or the closest periodic uplink channel quality report resource does not exist within a predetermined period of time (timer, sub-frame, frame, or COT count) in the methods 1) and 2), a UE transmits the ACK/NACK report to a periodic uplink resource allocated to a PCell, or requests aperiodic uplink resource allocation from the PCell. The PCell may be replaced by an SCell having PUCCH or an SCell having a configured report resource.

According to the embodiments, it is possible to improve an existing inaccurate channel quality report procedure to make a more accurate channel quality report possible and to reduce a failure rate of transmission and reception based on an inaccurate channel quality report.

[E. Method for Solving a Problem of Hidden Node Based on Multi-CCA]

The following method may be applied to all various modifications of a downlink or uplink of an LBE type.

Figures 42, 43:
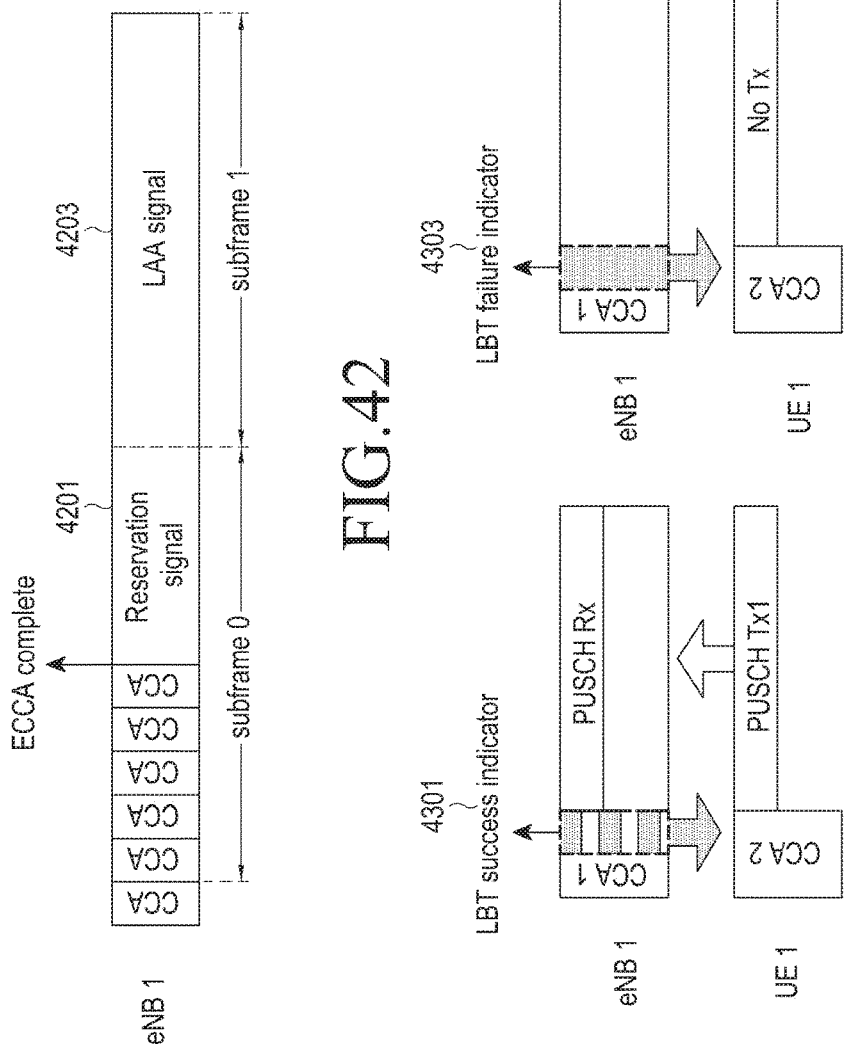
FIG. 42 illustrates an example of an LBE scheme using a reservation signal in an unlicensed band.
FIGS. 43, 44 and 45 illustrate examples of an indication signal for indicating a success/failure in LBT in up/down links according to various embodiments of the present disclosure.

FIG. 43 illustrates an example of an indication signal for informing of a success in LBT in an uplink and an example of an indication signal for informing of a failure in LBT in the uplink according to an embodiment of the present disclosure.

Referring to FIG. 43, an indication signal 4301 is shown for informing of a success in LBT in an uplink and an indication signal 4303 is shown for informing of a failure in LBT in the uplink.

Figure 44:
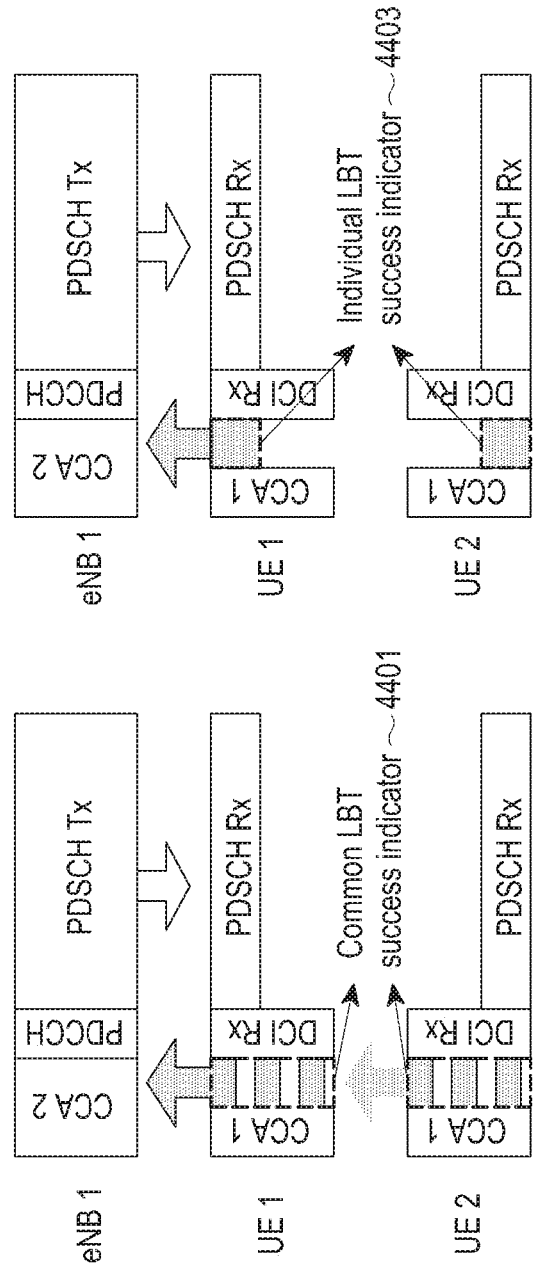

FIG. 44 illustrates an example of indication signals for informing of a success in LBT in a downlink according to an embodiment of the present disclosure.

Referring to FIG. 44, indication signals 4401 and 4403 are shown for informing of a success in LBT in a downlink.

Figure 45:
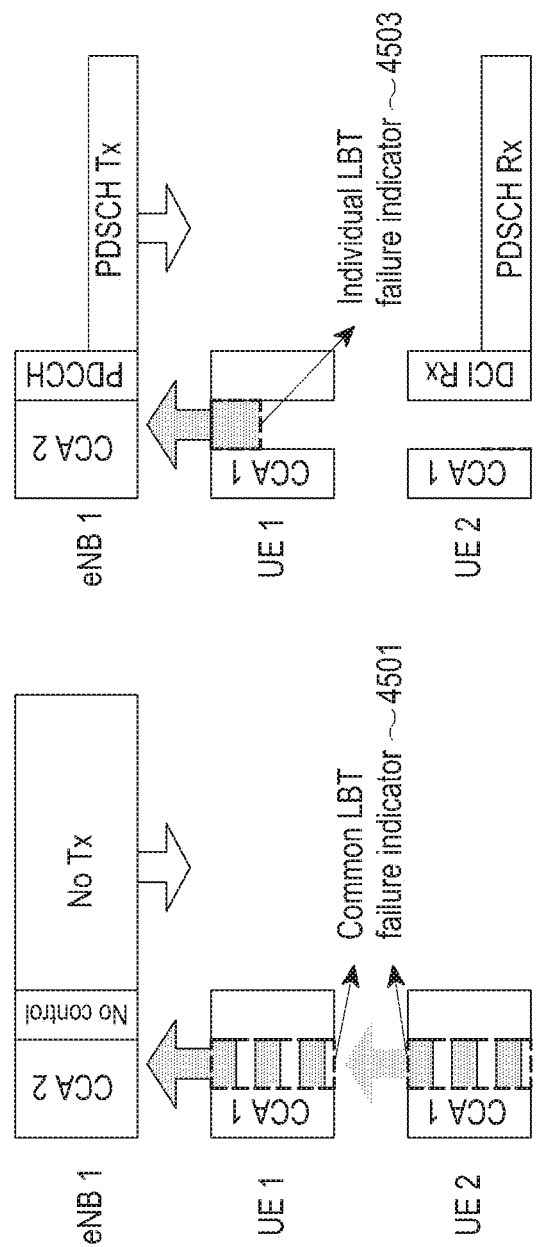

FIG. 45 illustrates an example of indication signals for informing of a failure in LBT in the downlink according to an embodiment of the present disclosure.

Referring to FIG. 45, indication signals 4501 and 4503 are shown for informing of a failure in LBT in the downlink.

In the uplink, CCA1 and CCA 2 overlap each other, and CCA1 occupies the front half of CCA2. CCA1 is for an eNB, and CCA2 is for a UE. If the eNB succeeds in CCA1, the eNB transmits a particular signal to inform of a success in LBT in the remaining interval of CCA2. In a case where a known signal is received from CCA2, the UE performs uplink transmission without considering a failure in CCA. According to the regulation, in order to prevent the UE from receiving the particular signal beyond a particular threshold, the eNB may restrict transmission power of a particular signal transmitted by CCA2. Alternatively, there is an empty resource in a particular signal of the eNB, so the UE may perceive the pattern of the empty resource in advance and may perform CCA2 only in the corresponding part.

In another example, CCA1 and CCA 2 overlap each other in an uplink, and CCA1 occupies the front half of CCA2. CCA1 is for an eNB, and CCA2 is for a UE. If the eNB succeeds in CCA1, the eNB transmits a particular signal to inform of a failure in LBT in the remaining interval of CCA2. 1) When a known signal is received from CCA2, or 2) when received energy is greater than or equal to a predetermined threshold value, the UE determines that CCA has failed and does not perform uplink transmission.

A similar method may also be applied to a downlink. In the downlink, CCA1 and CCA 2 overlap each other, and CCA1 occupies the front half of CCA2. CCA1 is for a UE, and CCA2 is for an eNB. If the UE succeeds in CCA1, a plurality of UEs transmit the same particular signal informing of a success in LBT to a composite channel and different LBT success signals for respective UEs to FDM/CDM in the remaining interval of CCA2. In a case where a known signal is received from CCA2, the eNB performs downlink transmission without considering a failure in CCA. According to the regulation, in order to prevent the eNB from receiving the particular signal beyond a particular threshold, the UE may restrict transmission power of a particular signal transmitted by CCA2, or the eNB may restrict the transmission of a particular signal by the UE or may perform scheduling in advance. Alternatively, there is an empty resource in a particular signal of the UE, so the eNB may perceive the pattern of the empty resource in advance and may perform CCA2 only in the corresponding part.

In another example, CCA1 and CCA 2 overlap each other in a downlink, and CCA1 occupies the front half of CCA2. CCA1 is for a UE, and CCA2 is for an eNB. If the UE succeeds in CCA1, a plurality of UEs transmit the same particular signal informing of a success in LBT to a composite channel and different LBT success signals for respective UEs to FDM/CDM in the remaining interval of CCA2. 1) When a known signal is received from CCA2, or 2) when received energy is greater than or equal to a predetermined threshold value, the eNB determines that CCA has failed and does not perform downlink transmission.

The method has an advantage of ensuring reception performance by solving a problem of a hidden node in advance. Physical resources of CCA1 and CCA2 may not be continuous in time, and a reservation signal or a general control/data signal may be sent in the interval. The eNB may regard, as CCA1, a CCA slot performed last when a back-off counter is 0 while ECCA of an LBE type is being performed, and the UE may perform CCA2 in succession. The UE may regard, as CCA1, a CCA slot performed last when a back-off counter is 0 while ECCA of an LBE type is being performed, and the eNB may perform CCA2 in succession. The eNB and the UE may all regard CCA slots performed last when a back-off counter is 0 while ECCA of an LBE type is being performed as CCA2 and CCA1 (in the case of a downlink) or as CCA1 and CCA2 (in the case of an uplink). CCA1 and CCA2 may be regarded as ECCA intervals having different lengths.

[F. Frame Structure Supporting Both an FBE Method and an LBE Method]

Figure 39:
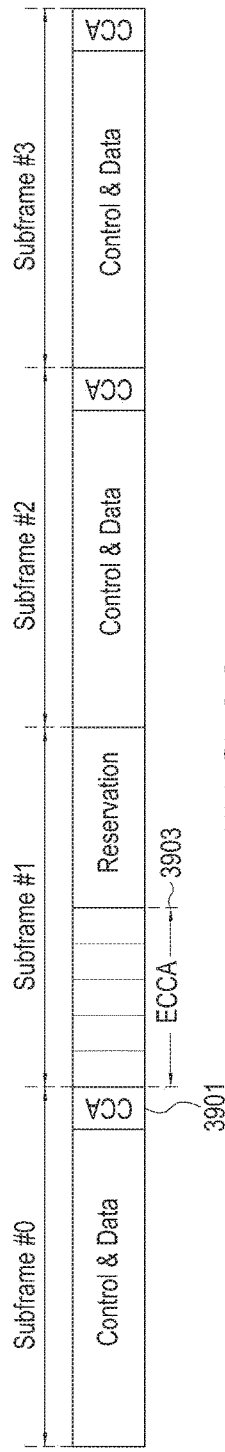
FIGS. 39, 40 and 41 illustrate various examples of a frame structure in which an eNB can dynamically select an FBE scheme and an LBE scheme according to various embodiments of the present disclosure.

FIG. 39 illustrates an example of a frame structure in which an eNB can dynamically select an FBE scheme and an LBE scheme according to an embodiment of the present disclosure.

Referring to FIG. 39, the eNB may freely dynamically select an FBE method and an LBE method using the frame structure of FIG. 39. The frame structure of FIG. 39 is characterized in that CCA is located at the end of a sub-frame, CCA 3901 is also located at the end of the next sub-frame in the same way in a case where FBE is supported (variable structure 1), and ECCA 3903 is located at the start of the next sub-frame in a case where LBE is supported (variable structure 2). The eNB may notify whether the variable structure 1 or 2 is used in a particular sub-frame of a particular radio frame to all UEs through a broadcast control channel or SIB, to individual UEs through a downlink control channel, or to individual UEs through a downlink data channel. In a case where whether the variable structure 1 or 2 is used in a particular sub-frame of a particular radio frame is notified to the individual UEs, the information notified through the broadcast control channel or SIB is overwritten. The eNB may notify whether to use a downlink or uplink of each sub-frame, in addition to whether to use the variable structure 1 or 2. In a system in which the variable structure 2 is used only in the downlink and the variable structure 1 is used only in the uplink, a UE performs operations corresponding to the downlink/uplink sub-frames according to information on whether to use the variable structure 1/2 without additional information. If a variable structure information signal is received through a PCell in an n-th sub-frame, the UE may determine the variable structure of the same sub-frame of an SCell. Furthermore, in order to prepare reception for the next sub-frame, the eNB may notify of variable structure information on the next k sub-frames, which do not include the same sub-frame, in the n-th subframe. In another example, in order to prepare reception for the next sub-frame, the eNB may notify of variable structure information on the next k sub-frames, which include the same sub-frame, in the n-th subframe. The k pieces of information may be configured as an upper layer control message, or the eNB may configure the k pieces of information as a common control message for the UE through a broadcast control channel or SIB. Alternatively, the eNB may configure k with a control signal for each UE. According to an embodiment, k may be a preset or constant value.

Figure 40:
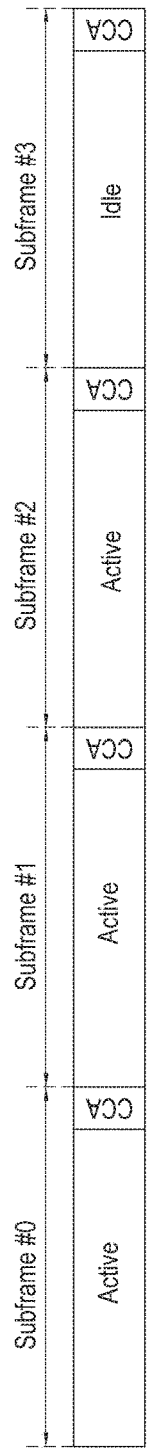

FIG. 40 illustrates another example of a frame structure in which an eNB can dynamically select an FBE scheme and an LBE scheme according to an embodiment of the present disclosure.

Referring to FIG. 40, a case shows where four continuous sub-frames of the variable frame structure of FIG. 39 are used as FBE.

Figure 41:
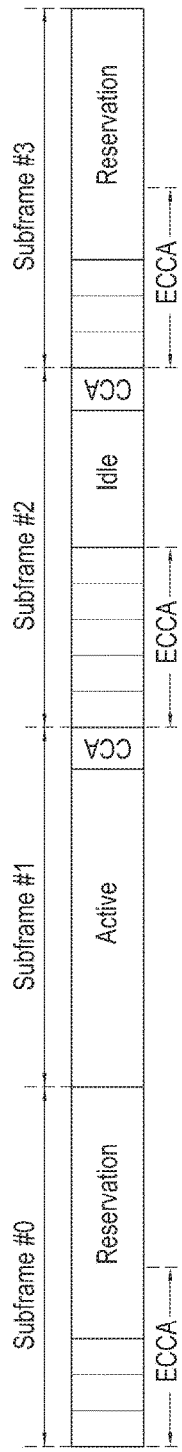

FIG. 41 illustrates another example of a frame structure in which an eNB can dynamically select an FBE scheme and an LBE scheme according to an embodiment of the present disclosure.

Referring to FIG. 41, a case shows where four continuous sub-frames of the variable frame structure of FIG. 39 are used as LBE.

Figure 46:
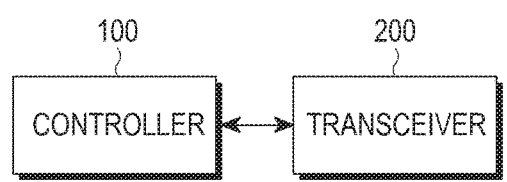
FIG. 46 is a block diagram illustrating a configuration of a communication device according to an embodiment of the present disclosure.

FIG. 46 is a block diagram of a communication device that can be applied to an eNB and a UE according to an embodiment of the present disclosure.

Referring to FIG. 46, the communication device includes a controller or at least one processor 100 and a transceiver 200. In FIG. 46, the controller 100 controls overall operations of the device, and the transceiver 200 transmits or receives a signal through a network. Further, using at least one of the embodiments of the present disclosure, the controller 100 controls such that at least one of CCA timing control, providing fairness, channel quality report, and link adaptation is performed. However, it is apparent that the controller 100 and the transceiver 200 are not necessarily implemented as separate devices and may be implemented in the same form as a single chip.

It should be noted that the diagram of the LAA terminal, the illustrative drawing of the LAA control/data signal transmission method, the illustrative drawing of the operating procedure of the LAA terminal, the illustrative drawing of the resource frame configuration, and the diagrams of the terminal, which have been illustrated in the above-described embodiments, are not intended to limit the scope of the present disclosure. Namely, all the configurations, entities, or operations described in the above embodiments should not be construed as being essential constituent elements for carrying out the present disclosure, and the present disclosure may also be implemented only by some elements without departing from the spirit and scope of the present disclosure.

The above described operations of the base station or UE may be implemented by providing a memory device storing corresponding program codes in any constituent unit of the base station or UE apparatus. That is, the controller of the base station or UE may perform the above described operations by reading and executing the program code stored in the memory device by means of a processor or a central processing unit (CPU). The entity, the function, the base station, the load manager, various structural elements of the terminal, modules and the like may be operated by using a hardware circuit, e.g., a complementary metal oxide semiconductor based logic circuit, firmware, software, and/or a combination of hardware and the firmware and/or software embedded in a machine readable medium. As an example, various electric configurations and methods may be carried out by using electric circuits such as transistors, logic gates, and an application specific integrated circuit (ASIC).

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method of controlling clear channel assessment (CCA) timing by a base station in a wireless communication system using an unlicensed band, the method comprising: determining whether to change CCA timing by comparing a number of at least one of continuous successes or continuous failures of the CCA with a predetermined threshold value; randomizing the CCA timing when the CCA timing is determined to be changed; and updating a frame based on the CCA timing changed according to the randomization of the CCA timing.

2. The method of claim 1, wherein the randomizing of the CCA timing is performed at a sub-frame level or at a symbol level.

3. The method of claim 2, wherein the randomizing of the CCA timing comprises:
selecting a predetermined number corresponding to a sub-frame number when the CCA timing is randomized at the sub-frame level; and
performing the CCA from a sub-frame corresponding to the selected number for a next fixed frame period.

4. The method of claim 2, wherein the randomizing of the CCA timing comprises:
selecting a predetermined number corresponding to a sub-frame number when the CCA timing is randomized at the symbol level; and
performing the CCA from a symbol corresponding to the selected number for a next fixed frame period.

5. The method of claim 1, wherein the randomizing of the CCA timing further comprises randomizing an ON/OFF period of the CCA.

6. A base station for controlling clear channel assessment (CCA) timing in a wireless communication system using an unlicensed band, the base station comprising: a transceiver configured to transmit and receive data; and at least one processor configured to: determine whether to change CCA timing by comparing a number of at least one continuous successes or continuous failures of the CCA with a predetermined threshold value, control randomization of the CCA timing when the CCA timing is determined to be changed, and control updating of a frame based on the CCA timing changed according to the randomization of the CCA timing.

7. The base station of claim 6, wherein the randomization of the CCA timing is performed at a sub-frame level or at a symbol level.

8. The base station of claim 7, wherein the at least one processor is further configured to:
select a predetermined number corresponding to a sub-frame number when the CCA timing is randomized at the sub-frame level; and
perform the CCA from a sub-frame corresponding to the selected number for a next fixed frame period.

9. The base station of claim 7, wherein the at least one processor is further configured to:
select a predetermined number corresponding to a sub-frame number when the CCA timing is randomized at the symbol level; and
perform the CCA from a symbol corresponding to the selected number for a next fixed frame period.

10. The base station of claim 6, wherein the at least one processor is further configured to control randomization of an ON/OFF period of the CCA.

* * * * *